US00RE39385E

(19) United States
(12) Reissued Patent
Brightman et al.

(10) Patent Number: US RE39,385 E
(45) Date of Reissued Patent: Nov. 7, 2006

(54) METHOD AND APPARATUS FOR PERFORMING MATHEMATICAL FUNCTIONS USING POLYNOMIAL APPROXIMATION AND A RECTANGULAR ASPECT RATIO MULTIPLIER

(75) Inventors: Thomas B. Brightman, Niwot, CO (US); Willard S. Briggs, Longmont, CO (US); Warren E. Ferguson, Dallas, TX (US)

(73) Assignee: Via-Cyrix, Inc., Taipei (TW)

(21) Appl. No.: 08/109,577

(22) Filed: Aug. 19, 1993

Related U.S. Patent Documents

Reissue of:
(64) Patent No.: 5,042,001
Issued: Aug. 20, 1991
Appl. No.: 07/416,110
Filed: Oct. 2, 1989

(51) Int. Cl.
*G06F 7/52* (2006.01)

(52) U.S. Cl. ..... 708/490
(58) Field of Classification Search ..... 364/721, 364/736, 748, 754; 708/276, 275, 277, 490, 708/495, 625
See application file for complete search history.

(56) References Cited

U.S. PATENT DOCUMENTS 4,338,675 A * 7/1982 Palmer et al. ..... 364/748
4,774,685 A * 9/1988 Samuels ..... 364/718
4,789,955 A * 12/1988 Umetani ..... 364/736
4,888,721 A * 12/1989 Kondoh et al. ..... 364/736

OTHER PUBLICATIONS

John F. Hart et al., "Computer Approximations", John Wiley & Sons, Inc., 1968, pp. 1–197.*
IEEE, 1959, "The Cordic Trigonometric Computing Techneque", by Jack E. Volder, pp. 226–230.*
American Federation of Information Processing Societies, Inc., 1971, pp. 272–278, "A Unified Algorithm for Elementary Functions", by J. S. Walther.*
Technical Paper, "New Scalar and Vector Elementary Functions", Mar. 1986, by Ramesh C. Agarwal, et al.*
Lecture notes, "Transcendental Approximations Using Cordic", by Jim Valerio, Jun. 14, 1988, pp. 1–14.*
Quong, David, "Floating–point uP implements high–speed math functions," EDN Electrical Design News, vol. 31, No. 3, pp. 143–150, (Feb. 6, 1986).

* cited by examiner

*Primary Examiner*—David H. Malzahn
(74) *Attorney, Agent, or Firm*—Fish & Neave IP Group; Ropes & Gray LLP; Mark D. Rowland

(57) ABSTRACT

A method for approximating mathematical functions using polynomial expansions is implemented in a numeric processing system (10) which comprises a control and timing circuit (18), a microprogram store (20) and a multiplier circuit (34). The multiplier circuit (34) may comprise a rectangular aspect ratio multiplier circuit (40) having an additional ADDER INPUT to enable the repeated evaluation of first order polynomials to evaluate polynomial expansions associated with each mathematical function. A constant store (28) is used to store predetermined coefficients for the polynomial expansion associated with each mathematical [functions] *function*. The microprogram store (20) is used to store argument transformation routines, polynomial expansions and result transformation routines associated with each mathematical function.

REEXAMINATION RESULTS

The questions raised in reexamination request No. 90/004, 138, filed Feb. 12, 1996, have been considered and the results thereof are reflected in this reissue patent which constitutes the reexamination certificate required by 35 U.S.C. 307 as provided in 37 CFR 1.570(e).

43 Claims, 8 Drawing Sheets

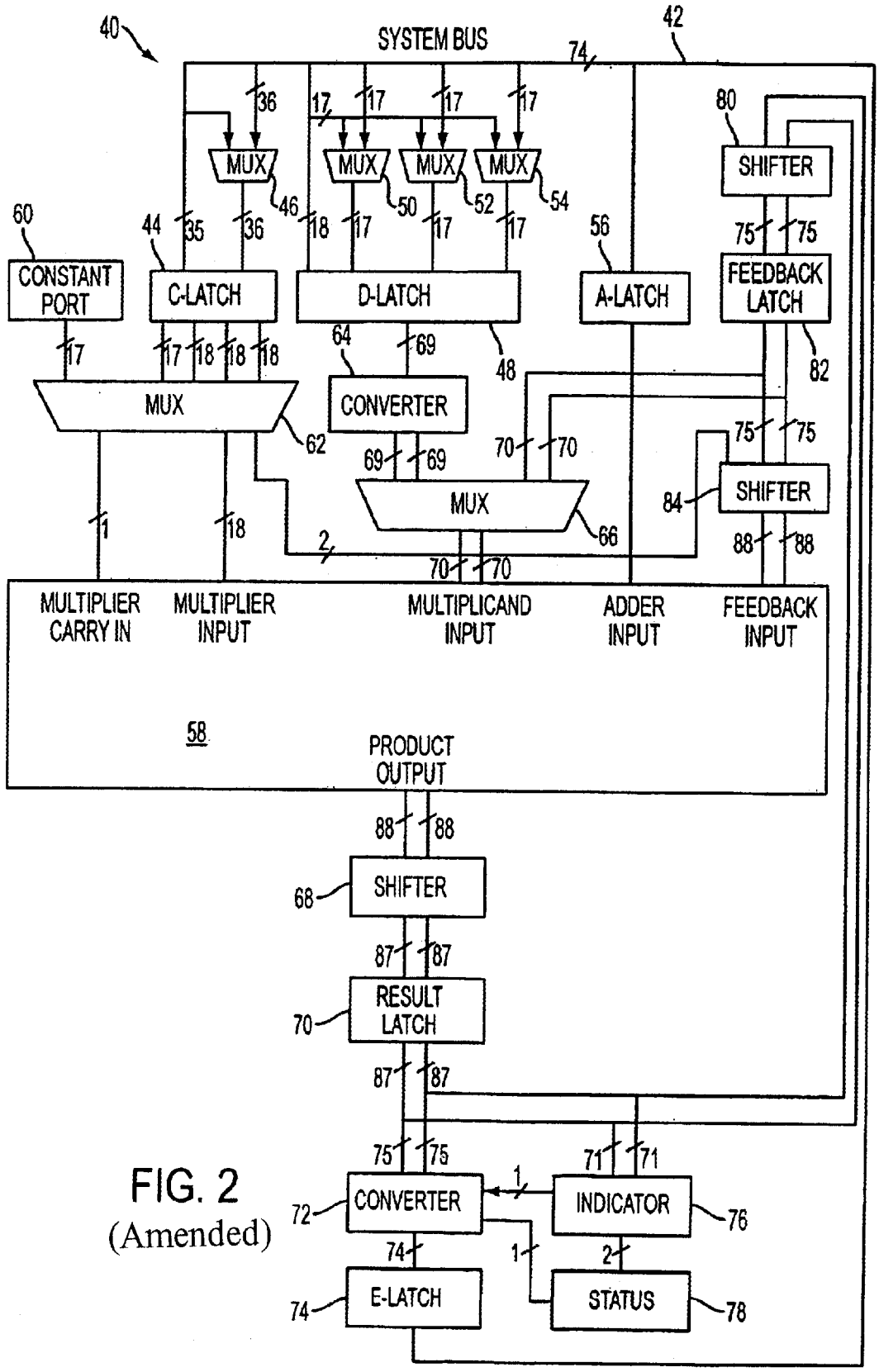
FIG. 2
(Amended)

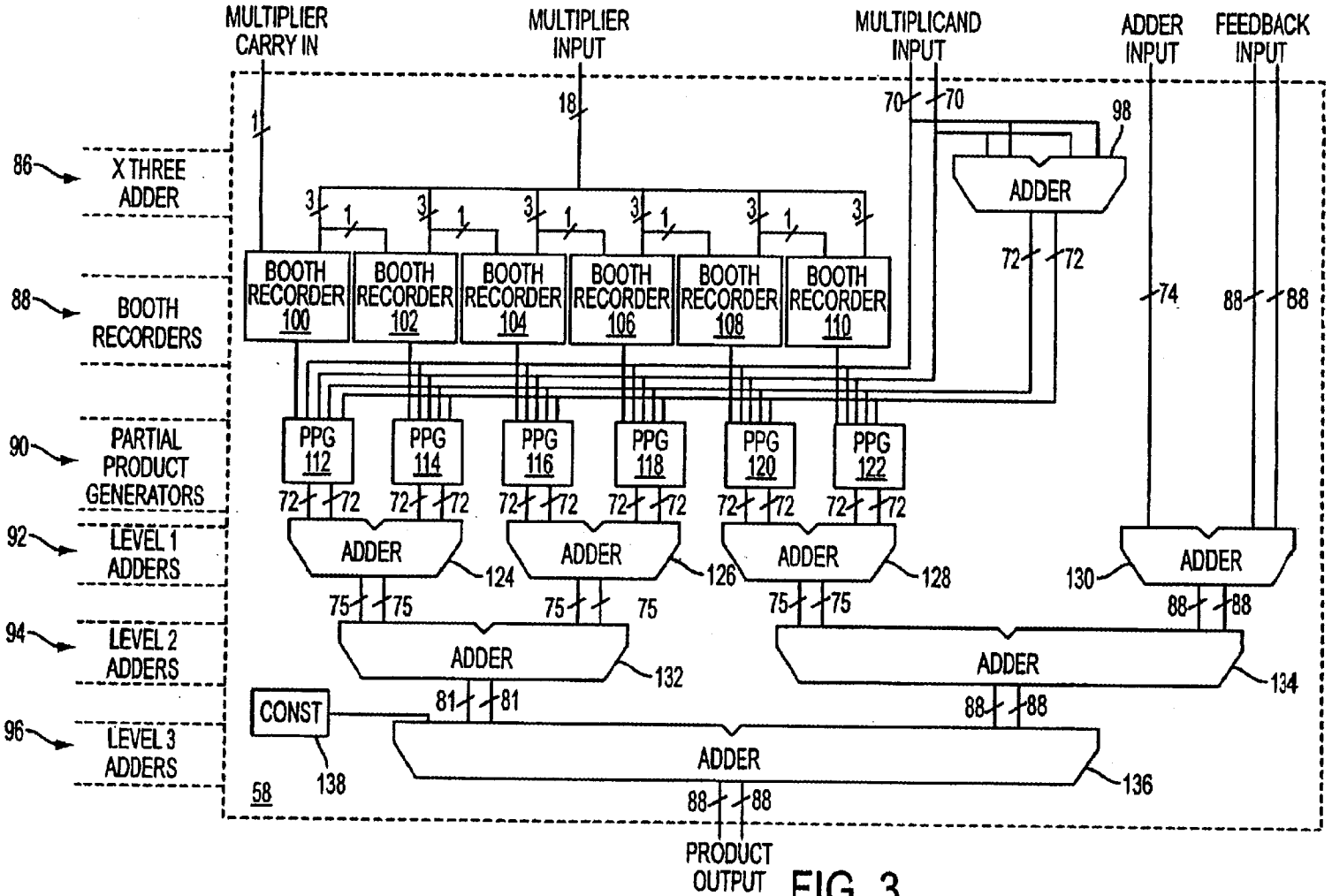
FIG. 3
(Amended)

| BORROW IN | CARRY IN | X | Y | BORROW OUT | CARRY OUT | Z |
|---|---|---|---|---|---|---|
| 0 | 0 | -1 | -1 | 1 | 0 | 0 |
| 0 | 0 | -1 | 0 | 1 | 1 | -1 |
| 0 | 0 | -1 | 1 | 1 | 1 | 0 |
| 0 | 0 | 0 | -1 | 1 | 1 | -1 |
| 0 | 0 | 0 | 0 | 0 | 0 | 0 |
| 0 | 0 | 0 | 1 | 0 | 1 | -1 |
| 0 | 0 | 1 | -1 | 1 | 1 | 0 |
| 0 | 0 | 1 | 0 | 0 | 1 | -1 |
| 0 | 0 | 1 | 1 | 0 | 1 | 0 |
| 0 | 1 | -1 | -1 | 1 | 0 | 1 |
| 0 | 1 | -1 | 0 | 1 | 1 | 0 |
| 0 | 1 | -1 | 1 | 1 | 1 | 1 |
| 0 | 1 | 0 | -1 | 1 | 1 | 0 |
| 0 | 1 | 0 | 0 | 0 | 0 | 1 |
| 0 | 1 | 0 | 1 | 0 | 1 | 0 |
| 0 | 1 | 1 | -1 | 1 | 1 | 1 |
| 0 | 1 | 1 | 0 | 0 | 1 | 0 |
| 0 | 1 | 1 | 1 | 0 | 1 | 1 |
| 1 | 0 | -1 | -1 | 1 | 0 | -1 |
| 1 | 0 | -1 | 0 | 1 | 0 | 0 |
| 1 | 0 | -1 | 1 | 1 | 1 | -1 |
| 1 | 0 | 0 | -1 | 1 | 0 | 0 |
| 1 | 0 | 0 | 0 | 0 | 0 | -1 |
| 1 | 0 | 0 | 1 | 0 | 0 | 0 |
| 1 | 0 | 1 | -1 | 1 | 1 | -1 |
| 1 | 0 | 1 | 0 | 0 | 0 | 0 |
| 1 | 0 | 1 | 1 | 0 | 1 | -1 |
| 1 | 1 | -1 | -1 | 1 | 0 | 0 |
| 1 | 1 | -1 | 0 | 1 | 0 | 1 |
| 1 | 1 | -1 | 1 | 1 | 1 | 0 |
| 1 | 1 | 0 | -1 | 1 | 0 | 1 |
| 1 | 1 | 0 | 0 | 0 | 0 | 0 |
| 1 | 1 | 0 | 1 | 0 | 0 | 1 |
| 1 | 1 | 1 | -1 | 1 | 1 | 0 |
| 1 | 1 | 1 | 0 | 0 | 0 | 1 |
| 1 | 1 | 1 | 1 | 0 | 1 | 0 |

FIG. 4
(Amended)

| C-LATCH QUADRANT | SHIFTER 84 CONTROL | MULTIPLIER INPUT | | MULTIPLIER CARRY IN |
|---|---|---|---|---|
| | | MSB | LSB | |
| FIRST | 0 | c[17] | c[16:0] | 0 |
| SECOND | 0 | c[35] | c[34:18] | c[17] |
| THIRD | 0 | c[53] | c[52:36] | c[35] |
| FOURTH | 0 | 0 | c[70:54] | c[53] |
| SECOND (20 BIT) | c[35:34] | c[34] | c[33:17] | 0 |
| CONSTANTS FROM CONSTANT PORT 60 | | | | |
| 0 | 0 | 0 | 0 | 0 |
| $10+2^{A}-17$ | 0 | 0 | 00A HEX | 0 |
| $2^{A}-1$ | 0 | 0 | 100 HEX | 0 |

FIG. 5
(Amended)

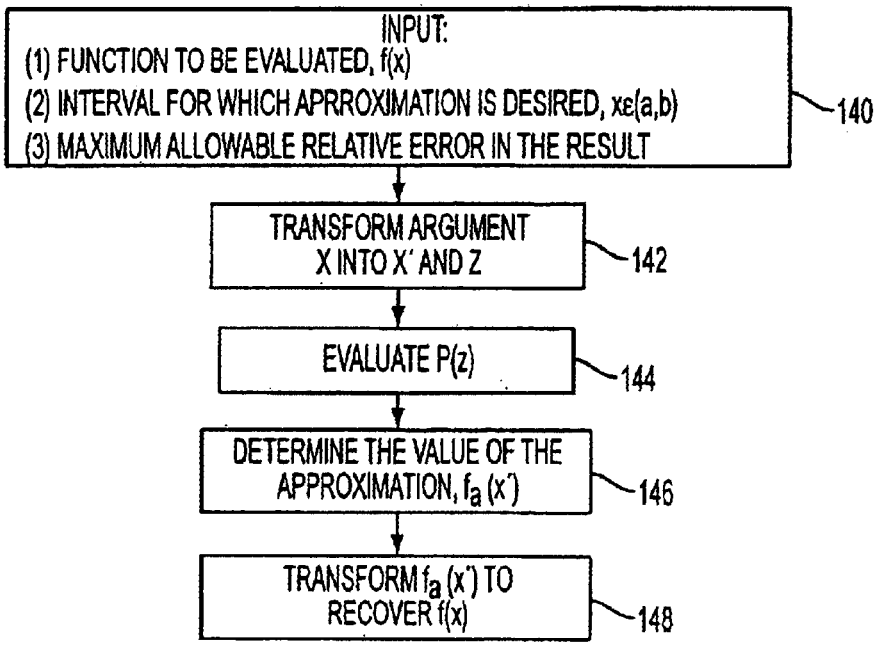
FIG. 6 (Amended)
| LSB'S OF THE QUOTIENT | RESULT TRANSFORMATION |
|---|---|
| 0 0 | SIN(X) = SIN(X') |
| 0 1 | $SIN(X)=\sqrt{1-SIN^2(X')}$ |
| 1 0 | SIN(X)= -X' * P(Z) |
| 1 1 | $SIN(X) = -\sqrt{1-SIN^2(X')}$ |
FIG. 7
```
a0 = +0.99999999999999999999981204044187
a1 = -0.16666666666666666662812878971137
a2 = +0.00833333333333333203345828724150
a3 = -0.00019841269841253106326129077 20
a4 = +0.00000275573192133904082334579 58
a5 = -0.00000002505210473832886629997 68
a6 = +0.00000000016058347630927407635 31
a7 = -0.00000000000075778682583633217 72
```
FIG. 8

```
a0 = +0.FFFFFFFFFFFFFFFF7
a1 = -0.2AAAAAAAAAAAAAA38E
a2 = +0.022222222222213259
a3 = -0.000D00D00D00C3FDF3
a4 = +0.00002E3BC74A613530
a5 = -0.0000006B99149907B8
a6 = +0.00000000B0903AF1F1
a7 = -0.0000000000D54C4BA3
```

FIG. 9
(Amended)

LET $x=(-1)^S*(M)*2^E$ BE THE NORMALIZED BINARY FORMAT OF THE INPUT ARGUMENT x.
S IS THE SIGN OF x, M IS THE SIGNIFICAND OF x AND E IS THE EXPONENT OF x.

IF $M > \sqrt{2}$

THEN $y = M/2-1$ AND $LOG_2(x) = (E+1) + LOG_2(1+y)$

ELSE $y = M-1$ AND $LOG_2(x) = (E) + LOG_2(1+y)$

FIG. 10
(Amended)

```
b0 = 2.8853900817779268147197013960580
b1 = 0.96179669392597560591013447635 97
b2 = 0.57707801635558424024465839444 08
b3 = 0.41219858311161940440075037875 48
b4 = 0.32059889786811142113160175954 28
b5 = 0.26230820279713188318955626018 25
b6 = 0.22195204304761034750061373934 27
b7 = 0.19240865067442430379606947297 24
b8 = 0.16832335367640899408087620332 93
b9 = 0.17375565173798872420780918155 70
```

FIG. 11

```
b0 = +0.B8AA3B295C17F0BBBE
b1 = +0.3D8E13B87407FAEDE0
b2 = +0.24EED8A1DF37E8B8CF
b3 = +0.1A61762A7B011E4D14
b4 = +0.1484B13D5E8A2933E2
b5 = +0.10C9A8581F1E2E9533
b6 = +0.0E3476578ADF28FE58
b7 = +0.0C506C5F874E14E9F0
b8 = +0.0AC5CF50CC5DAF03C6
b9 = +0.0B1ED0066D6DCEC6AC
```

FIG. 12 (Amended)

```
a0 = +0.B8AA3B295C17F0BBBE
a1 = +0.01EC709DC3A03FD76F
a2 = +0.00093BB62877CDFA2E
a3 = +0.000034C2EC54F6023C
a4 = +0.000001484B13D5E8A2
a5 = +0.0000000864D42C0F8F
a6 = +0.0000000038D1D95E2B
a7 = +0.00000000018A0D8BF0
a8 = +0.00000000000AC5CF50
a9 = +0.00000000000058F680
```

FIG. 13
(Amended)

METHOD AND APPARATUS FOR PERFORMING MATHEMATICAL FUNCTIONS USING POLYNOMIAL APPROXIMATION AND A RECTANGULAR ASPECT RATIO MULTIPLIER

Matter enclosed in heavy brackets [ ] appears in the original patent but forms no part of this reissue specification; matter printed in italics indicates the additions made by reissue.

TECHNICAL FIELD OF THE INVENTION

This invention relates in general to the field of performing mathematical functions using electronic devices. More specifically, the present invention relates to a method and apparatus for performing mathematical functions using polynomial approximations in a system comprising a rectangular aspect ratio multiplier circuit.

BACKGROUND OF THE INVENTION

Computation of elementary and transcendental mathematical functions such as sine, cosine, logarithms and others is a required function in modern computing systems. These functions may be evaluated for any point in their domain by any of several methods. Best known among these methods are the Taylor series expansion, the Chebyshev series expansion, the CORDIC method and derivatives, Brigg's method for logarithms, Newton's method and polynomial approximation. These methods vary principally in the primitive operations they require, such as addition[,] *and* multiplication [and factorial evaluation], and the number of iterations they require to produce a result of given accuracy. An important consideration of all of these methods is the precision required of the argument and of intermediate computations to preserve accuracy and other valuable properties in the result.

Most popular in integrated circuit implementations for calculators and microprocessors is the CORDIC method. The popularity of this method stems from its need to use only the relatively simple primitive operations of addition and shift operations, its thorough development in the literature, and the wide range of trigonometric and exponential functions which may be evaluated with the method. Especially relevant is the efficiency with which addition and shift operations are implemented using electronic integrated circuit techniques.

The disadvantages of the CORDIC method are: (1) the large number of constants required to achieve a given level of accuracy, usually one for every two bits of precision in the result, (2) the large number of iterations required to produce a result, one for each constant, (3) the large number of primitive operations per iteration, usually three per iteration, and (4) the rapid accumulation of round-off error in the result, usually one unit in the last place per iteration. As a result, for example, the computation of the sine function to 64 bits would require 32 constants, 32 iterations, 96 [additional] *addition* cycles and provide only 59 [bites] *bits* of accuracy in the result.

In contrast to the CORDIC method, the other methods mentioned above are used infrequently in integrated circuit implementations due primarily to the primitive operations required which usually include a multiply as well as an add in each iteration. The consequence of this requirement is that evaluation must proceed very slowly, due to the use of add-shift type multiplies, or considerable circuitry and, therefore, chip surface area must be devoted to the implementation of a fast multiplier. The circuit complexity of the array multiplier is further complicated or, equivalently, the evaluation speed correspondingly reduced by the requirement of these other algorithms to perform full-precision multiplication of the argument by itself or by a constant.

Other disadvantages attendant to the methods other than the CORDIC method include the need for many iterations, slow or non-uniform convergence to the result, oscillatory behavior around the infinitely precise values resulting in non-monotonic behavior of the [approximate] *approximated* function, and the requirement for additional primitive operations such as division [and factorials]. The consequence of these disadvantages is larger circuit size and complexity, slower evaluation of the desired function and degraded accuracy.

Accordingly, a need has arisen for a method of function approximation which requires relatively few iterations to achieve a given level of accuracy, converges quickly and uniformly, accumulates round-off error in a relatively slow manner, and produces monotonic approximations to monotonic functions.

SUMMARY OF THE INVENTION

In accordance with the present invention, a method of mathematical function approximation is provided which substantially eliminates or reduces disadvantages and problems associated with prior methods of function approximation.

The function approximation method of the present invention comprises three major steps: (1) reduction of the starting argument x to a range suitable for computation of the approximation; (2) computation of the approximation using the reduced argument [u]; and (3) transformation of the computed result to a final value which corresponds to the function evaluated at the starting argument x.

More specifically, the present invention uses a polynomial based approximation to a mathematical function. The polynomial approximation is made to a function of reduced argument and uses Horner's rule to obtain a numerical value for the polynomial. Evaluation of the polynomial is performed by repeated use of a rectangular *aspect ratio* (*short by full*) multiplier with an adder port.

An important technical advantage of the present invention inheres in the fact that it uses a rectangular aspect ratio multiplier. The use of the rectangular *aspect ratio* multiplier saves time during several steps in the function approximation process. The operations of multiplication, division and square root involved in the transformation and polynomial evaluation processes are performed quickly through the use of new methods associated with the rectangular *aspect ratio* multiplier. Additionally, the short by [long] *full* multiplier can perform full precision multiplication operations with less than full by full multiplies, depending on the number of significant bits in the operands, thus saving time and the space ordinarily required to implement a full precision multiplier.

A further technical advantage of the present invention inheres in the fact that it uses fewer constants than other approximation methods to achieve a given level of accuracy. Thus, fewer iterations are necessary to evaluate the polynomial approximation to the function and less constant storage space is needed.

Another technical advantage of the present invention inheres in the fact that the approximation to the function preserves monotonic behavior of the function. The invention thus overcomes objections of non-monotonicity frequently made regarding the use of polynomial methods of function approximation.

A final technical advantage of the present invention inheres in the fact that the constants, the arguments to the function, as well as the function are scaled. This scaling allows for a less complex multiplier to be used in the evaluation of the approximation. This scaling also allows for full precision multiplies between the constants and the arguments to be performed in less clock cycles than would be necessary for unscaled constants and arguments.

BRIEF DESCRIPTION OF THE DRAWINGS

A more complete understanding of the method of the present invention may be acquired by referring to the detailed description and claims when considered in conjunction with the accompanying drawings, wherein:

FIG. 2 is a block diagram of a multiplier circuit suited to be used in conjunction with the method of the present invention;

FIG. 3 is a schematic diagram of a multiplier core circuit suitable to be used in conjunction with the method of the present invention;

FIG. 4 is a truth table illustrating the operation of the adder circuits used in the multiplier circuit of FIG. 2[.];

FIG. 5 is a tabular description of a multiplexer to be used in conjunction with the method of the present invention;

FIG. 6 is a flow chart illustrating the method of the present invention;

FIG. 7 is a table indicating the required result transformations for the evaluation of the sine function using the method of the present invention[:];

FIGS. 8 and 9 are tables of constants used in conjunction with the method of the present invention;

FIG. 10 illustrates the necessary equations for the recovery process for the $\log_2$ function using the method of the present invention; [and]

FIGS. 11, 12 and 13 are tables of constants used in conjunction with the method of the present invention[.]; *and*

*FIG. 14 illustrates circuit components of a numeric system embodying features of the present invention.*

DETAILED DESCRIPTION OF THE INVENTION

Figure 1:
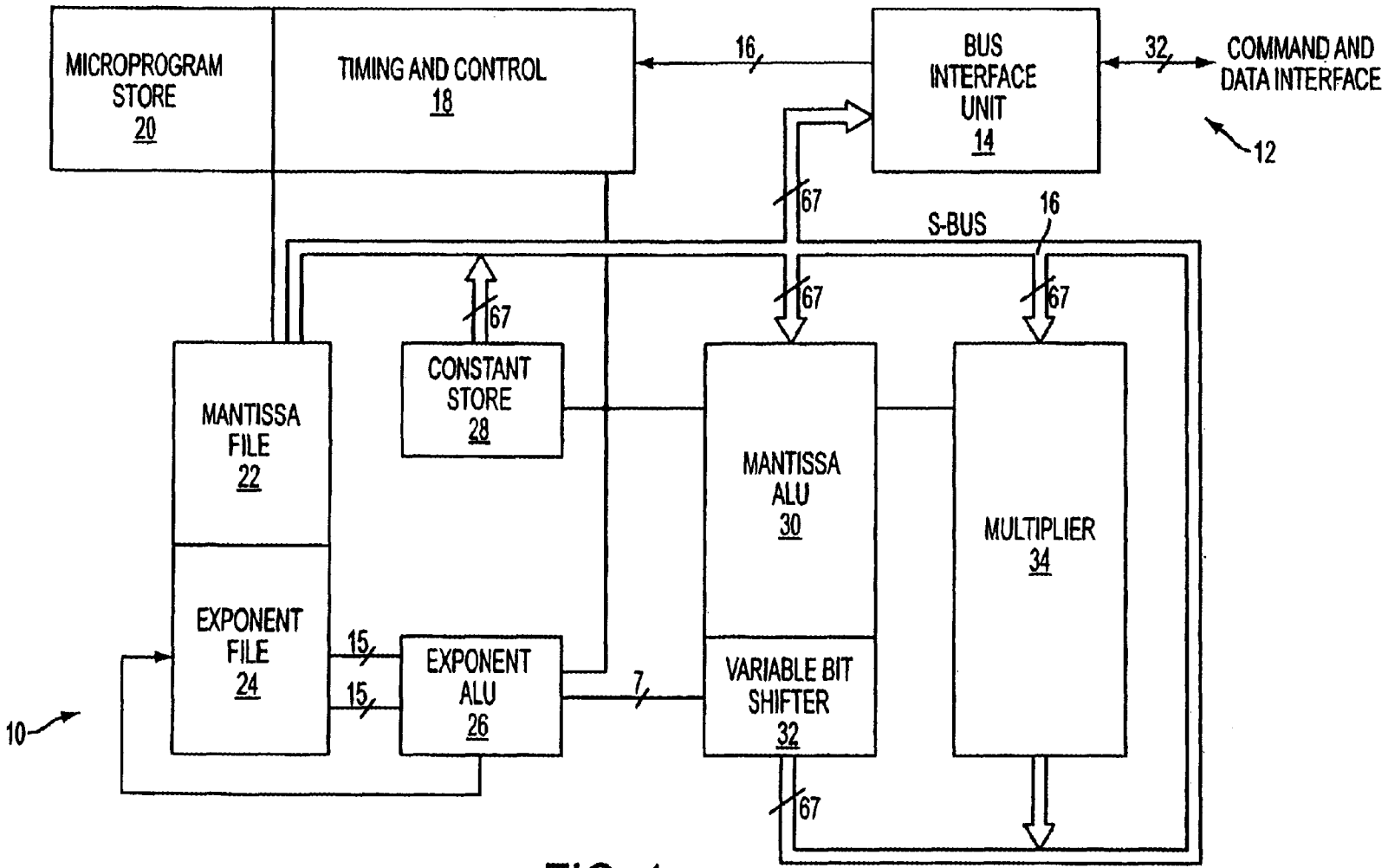
FIG. 1 is a block diagram of a numeric processing system constructed to utilize the method of the present invention.

The method of calculating mathematical functions according to the present invention may be implemented in a numeric processing system which comprises a multiplier circuit with the capability to perform the primitive operations of *addition,* multiplication, division and the square root function.

FIG. 1 is a block diagram of an exemplary numeric processing system. FIG. 1 illustrates a system, indicated generally at 10, which interfaces with an integrated data processing system through a command and data interface indicated generally at 12. The command and data interface 12 is coupled to a bus interface unit 14 which acts to decode and route the appropriate commands and data values received from the integrated data processing system. The bus interface unit 14 is coupled to a 67-bit system bus 16 which serves to route data throughout system 10. The bus interface unit is also coupled through a 16-bit control line to a control and timing circuit 18. Control and timing circuit 18 is coupled to a microprogram store 20. Control and timing circuit 18 acts to oversee the operations of system 10 and uses microprograms stored in microprogram store 20 to implement the various functions required of system 10 by the integrated data processing system. For example, each of the mathematical functions, such as the sine, cosine or logarithm functions have corresponding routines which are stored in microprogram store 20 and implemented by control and timing circuit 18. The control and timing circuit 18 and microprogram store 20 are coupled to a mantissa file 22 which is also coupled to the system bus 16. The mantissa file 22 receives data values off of the system bus 16 and acts as a memory unit for operands to be used in the calculation of functions performed by system 10. Mantissa file 22 is associated with an exponent file 24 which receives the exponent portion of data values off the system bus 16 and acts as a memory similar to mantissa file 22 for the exponent portions of the floating point operands used by system 10. The exponent file 24 is coupled to an exponent ALU 26. The exponent ALU 26 operates to add and subtract values from values stored in exponent file 24 during the implementation of mathematical functions in system 10. Exponent ALU is coupled to the control and timing circuit 18 which controls its operation.

A constant store 28 is also coupled to the system bus 16. The constant store 28 permanently stores and supplies constants which are used in the implementation of the method of mathematical function evaluation of the present invention as controlled by the control and timing circuit 18. Also coupled to the system bus 16 is a mantissa ALU 30. The mantissa ALU 30 receives the mantissa portion of operands from the system bus 16 and performs addition, subtraction and rounding operations on these operands as required by functions being implemented in system 10. The mantissa ALU comprises a variable bit shifter 32 which can shift operands right or left any number of bit positions. The variable bit shifter 32 is coupled to the system bus 16 as well as the exponent ALU 26. The variable bit shifter outputs seven bits of information to the exponent ALU 26 in order to communicate a shift count to the exponent ALU 26. Accordingly, the exponent associated with a mantissa shifted by variable bit shifter [52] *32* may be incremented or decremented as necessary.

A multiplier circuit 34 is also coupled to system bus 16. One possible embodiment of multiplier circuit 34 will be discussed specifically with reference to FIGS. 2 and 3. Generally, however, multiplier circuit 34 operates to perform multiplication, division and square root operations as necessary for the implementations of the mathematical functions evaluated by system 10. Multiplier circuit 34 and mantissa ALU 30 are both coupled to the control and timing circuit 18 which control their operation according to microprograms stored in microprogram store 20.

In summary, system 10 represents a system which comprises the necessary control and data management circuitry to implement the method of mathematical function evaluation of the present invention. Two important elements are required for the implementation of the method of the present invention. The method requires a control and storage circuit for implementing routines for each mathematical function to be evaluated. Further, the method requires a multiplier circuit capable of performing efficient and accurate multiplication[, division, and square root operations]. System 10 illustrated in FIG. 1 comprises these important elements and therefore is capable of efficiently performing the method of mathematical function evaluation of the present invention. System 10 is however, merely one possible embodiment of a circuit capable of using the method of the present invention and is presented solely for the purpose of teaching the method of the present invention and should not be construed to limit the method of the present invention to any particular circuit embodiment.

FIG. 2 is a schematic diagram of a multiplier circuit, indicated generally at 40, which is suited to be used in accordance with the method of the present invention, and which could function as multiplier circuit 34 of system 10 discussed with reference to FIG. 1. Circuit 40 comprises a system bus 42 which serves to allow the multiplier circuit 40 to communicate with other components (not shown in FIG. 2) of an integrated digital data processing system. Multiplier circuit 40 may comprise, for example, a portion of an arithmetic logic unit which could be used in a microprocessor or a numeric co-processor such as system 10 illustrated in FIG. 1. In such a system, system bus 42 would be coupled to system bus 16 to allow circuit 40 to receive operands on which to perform multiplication, division and square root operations.

System bus 42 is seventy-four bits wide and has the thirty-five most significant bits coupled directly to a C-latch 44. The next most significant thirty six bits of the system bus 42 are coupled to C-latch 44 through a first multiplexer 46 (MUX 46). First MUX 46 is also coupled to the most significant thirty five bits of system bus 42.

The eighteen most significant bits of system bus 42 are coupled directly to a D-latch 48. The next most significant 51 bits of system bus 42 are divided into three groups of seventeen bits each of which are each respectively coupled to a second MUX 50, a third MUX 52 and a fourth MUX 54. An additional input of MUX's 50, 52 and 54 is also coupled to the seventeen most significant bits of system bus 42. The outputs of MUX's 50, 52 and 54 are coupled to three additional inputs to D-latch 48.

System bus 42 is coupled to the input of an A-latch 56. The output of A-latch 56 is coupled to an ADDER INPUT of multiplier core 58.

A constant port 60 is coupled to one input of a fifth MUX 62. Three 18-bit outputs and one 17-bit output of the C-latch 44 are coupled to four inputs of the fifth MUX 62. A single bit is input from the fifth MUX 62 to the MULTIPLIER CARRY-IN input of multiplier core 58. Eighteen bits are input from the fifth MUX 62 into the MULTIPLIER input of multiplier core 58. Two bits are output from the fifth MUX 62 to a control input of shifter 84.

Sixty-nine bits are output from the D-latch 48 into a first converter 64. Converter 64 operates to convert a non-redundant sixty-nine bit wide number into a signed digit number. Therefore, sixty-nine data bits and sixty-nine signed bits are output by first converter 64 into a sixth MUX 66. Seventy data bits and seventy signed bits are output by the sixth MUX 66 into the MULTIPLICAND input of multiplier core 58.

Eighty-eight data bits and eighty-eight [signed] *sign* bits are output from the product output of the multiplier core 58 to a shifter 68. Shifter 68 operates to shift the result output by the multiplier core 58 to the right one place, to the left one place or pass without shifting. The most significant sign bit and data bit are truncated after appropriate correction. The remaining eighty-seven data bits and eighty-seven sign bits are output by shifter 68 into a result latch 70. The eighty-seven data bits and eighty-seven sign bits are stored in result latch 70 and are output to three separate locations. The seventy-five most significant data bits and the seventy-five most significant sign bits are output to a second converter 72. Second converter 72 converts the signed digit number at its inputs into a 74-bit number in non-redundant format and outputs this number to an E-latch 44. The E-latch 74 is coupled to the system bus 42.

The seventy-one least significant data bits and the seventy-one least significant sign bits output by the result latch 70 are input into an indicator 76. The indicator 76 is coupled to the converter 72 and to a status block 78. The eighty-seven data bits and eighty-seven sign bits output by the result latch 70 are input into a shifter 80. The output of shifter 80 is coupled to a feedback latch 82. The output of the feedback latch is coupled to a shifter 84. The output of the shifter 84 comprises eighty-eight data bits and eighty-eight sign bits and is coupled to the FEEDBACK input of the multiplier core 58. Seventy data bits and seventy sign bits output by the feedback latch 82 are also input into sixth MUX 66 such that they may be selectively input into the MULTIPLICAND input of multiplier core 58.

Multiplier core 58 is shown in greater detail in the schematic diagram illustrated in FIG. 3. Generally, multiplier core 58 comprises a series connection of a times-three adder level indicated generally at 86, a Booth recoder level indicated generally at 88, a partial product generator level indicated generally at 90, and three levels of adders indicated generally at 92, 94 and 96.

The seventy data bits and seventy sign bits of the MULTIPLICAND INPUT are input into a times-three adder 98 which forms times-three adder level 86. Times-three adder 98 is operable to [add in] *provide* the multiples of three [into] *times the multiplicand to* the partial product generator level 90. Multiplication operations involving multiples of one, two and four may be accomplished using shift operations. However, multiplies of three require adder logic which is present in the times-three adder 98.

The single bit of the MULTIPLIER CARRY-IN and the eighteen bits of the MULTIPLIER input are input in parallel to the Booth recoder level 88 which comprises Booth recoders 100, 102, 104, 106, 108 and 110. Each of the Booth recoders 100–110 receive three bits of the multiplier from the multiplier input and are coupled to an adjoining Booth recoder through a single bit carry line coupled to its input. The first Booth recoder 100 has its carry-in input coupled to the single bit of the MULTIPLIER CARRY-IN input.

The output of each of the Booth recoders 100 through 110 are coupled respectively to one of the partial product generators 112, 114, 116, 118, 120 and 122. The MULTIPLICAND input is also coupled in parallel to each of the partial product generators 112 through 122. In addition, the output of times-three adder 98 is coupled to each of the partial product generators 112 through 122. In this manner, the Booth encoded multiplier, the [even] multiplies of the multiplicand *by 1, 2 and 4*, and the appropriately added [multiples] *multiple* of three of the multiplicand, are all [combined in] *available to* the partial product generators to form the partial products to be added together to form the 88-bit product.

Accordingly, the outputs of each of the partial product generators 112 through 122 are input into three level-one adders 124, 126 and 128. In addition, a fourth level-one adder 130 has as its input the seventy-four bit ADDER input and the eighty-eight [signed] *sign* and data bit input of the FEEDBACK input. The fourth level-one adder 130 helps to illustrate an important technical advantage of the array multiplier of the present invention.

Because of the ability to access the adder tree formed by the level-one [adder] *adders* 92, the level-two [adder] *adders* 94 and the level-three adder 96, the array multiplier of the present invention is able to perform operations of the form AX+B+C, where A is the 18-bit multiplier, X can be a seventy bit signed digit multiplicand, B can be a 74-bit non-redundant number and C can be a [70-bit] *75-bit* signed digit number.

The outputs of the level-one adders 124 and 126 comprise seventy-five data bits and seventy-five sign bits each, and are input into a first level-two adder 132. The output of level-one adder 128 comprises seventy-five data bits and seventy-five sign bits and is input into one side of the second level-two adder 134. The output of fourth level-one adder 130 comprises eighty-eight sign bits and eighty-eight data bits, and is input into the remaining side of second [level to] *level-two* adder 134.

The output of first [level to] *level-two* adder 132 comprises eighty-one sign bits and eighty-one data bits, which are input into a first side of a level-three adder 136. Also input into the first side of level-three adder 136 are two bits which are input from a constant port 138. The [output-of] *output of* second [level to] *level-two* adder 134 comprises eighty-eight sign bits and eighty-eight data bits which are input into a second side of [level three] *level-three* adder 136. The output of [level three] *level-three* adder 136 comprises eighty-eight sign bits and eighty-eight data bits and comprises the final product output which is output by the multiplier core 58 to the shifter 68 which was shown in FIG. 1.

In operation, the C-latch 44 generally contains the multiplier of a multiplication operation. The D-latch 48 generally contains the multiplicand. The product of the multiplication operation is generally contained in the E-latch 74. The feedback latch 82 is used to contain the output of the multiplier core 58 in signed digit format so that it may be used in subsequent multiplication operations.

Most data transfers to and from the multiplier circuit 40 are across the [seventy-five] *seventy-four* bit wide system bus 42. For example, the C-latch 44 and the D-latch 48 are both loaded from the system bus 42. It should be understood that FIGS. 2 and 3 are schematic illustrations showing the data paths through the multiplier circuit [10] *40*. For the purpose of clarity, the control paths used to operate the multiplier circuit [10] *40* have not been shown. It should be understood that suitable timing and control signals are input into the necessary components of multiplier circuit 40 to insure the appropriate and efficient operation of its component parts. As illustrated in FIG. 1, these control signals may be generated and supplied by control and timing circuit 18.

Signed Digit Arithmetic

The signed digit notation used in the multiplier circuit 40 uses a digit set comprising −1, 0 and 1. These digits are defined by a sign bit and a data bit according to the following table:

| Sign | Data | Value |
|---|---|---|
| 0 | 0 | 0 |
| 0 | 1 | 1 |
| 1 | 1 | −1 |

A high sign bit and a low data bit which would comprise a "−0" is not an allowed condition.

The basic signed digit adder used in the three levels of adders 92, 94 and 96 used in multiplier core 58, [each] accepts two signed digit numbers, a carry-in and a borrow-in. Each adder reduces these inputs to a single signed digit number, a carry-out and a borrow-out. FIG. 4 illustrates in tabular form a truth table which shows the addition of an operand X to an operand Y to produce a sum Z. The values for the borrow-in, carry-in, borrow-out and carry-out are also shown.

The speed of an adder circuit is normally limited by the propagation of the carry signal from one bit to the next. This is because the carry-out signal from one bit of an adder is dependent on the carry-in to that adder. Prior art advances in adder circuits generally have to do with shortening this path by such means as carry-look-ahead or carry-select circuits. Because of the novel structure of the multiplier circuit used in conjunction with the method of the present invention, it can be seen in the truth table shown in FIG. 4 that the borrow-out is independent of the borrow-in. In addition, the carry-out signal may be affected by the borrow-in, but is independent of the carry-in. This results in the fact that the borrow or carry is never propagated more than two bits.

An important consideration of the signed digit adder associated with the truth table shown in FIG. 4 is that the redundancy of the digit set allows carries and borrows to be generated when they are not required. This is generally not a concern unless it happens on the most significant bit of a number when it causes the generation of "leading ones". Leading ones always take the form of *a* one of either sign followed by one or more ones of the [of] opposite sign. Leading ones exist on the most significant end of a signed digit number which when converted to non-redundant form, become leading zeroes. Unlike leading zeroes, however, leading ones cannot simply be truncated. Since the sign of the most significant one determines the sign of the number, truncating leading ones could result in a new number whose most significant one was of the opposite sign. Using appropriate logic, the multiplier circuit used in conjunction with the method of the present invention allows for leading ones to be truncated. Numbers that must be truncated on the most significant end require an extra bit which is somewhat analogous to a [signed] *sign* bit in twos complement notation. This extra bit is referred *to* as the overflow bit.

Additionally, the adders used in the multiplier circuit 40 are sufficiently wide such that the data being added does not require the generation of a borrow or carry. However, since the data format is redundant, the truth table shown in FIG. 4 can produce borrows and carries when they are not required. The two cases where this is possible are when a carry is produced and the value for Z is equal to −1 or when a borrow is produced and the value for Z is equal to 1. These outputs would result in the creation of leading ones. In order to prevent this from occurring, the truth table for the most significant bit of each adder is slightly modified. The changes are illustrated in the following truth table.

| Borrow-In | Carry-In | X | Y | X |
|---|---|---|---|---|
| 0 | 0 | 0 | 1 | 1 |
| 0 | 0 | 1 | 0 | 1 |
| 0 | 1 | −1 | −1 | −1 |
| 1 | 0 | 1 | 1 | 1 |
| 1 | 1 | −1 | 0 | −1 |
| 1 | 1 | 0 | −1 | −1 |

Any non-redundant number of a given number of bits in length may have an unlimited number of bits when expressed in [non-redundant] *redundant* format since there can be an unlimited number of leading ones. This conversion is shown in symbolic notation as follows:

$$n_x \ldots n_3, n_2, n_1, n_0 = \ldots r_{x+2}, r_{x+1}, r_x \ldots r_3, r_2, r_1, r_0$$

This generation of leading ones can present a problem when trying to truncate leading *signed* bits from a number. The redundant number can easily be truncated to x+1 *signed* bits with the following correction:

if $r_{x+2}$[=]⑤0, then invert the sign of [$r_x$] $r_{x+1}$ which results in $$n_x \ldots n_3, n_2, n_1, n_0 = [\ldots] r_{x+1}, r_x \ldots r_3, r_2, r_1, r_0$$

Thus, the entire string of *signed* bits more significant than *signed* bit [x−1] $r_x$ is reduced through this conversion to a [0] single *signed* bit [x−1] $r_{x+1}$ called the overflow bit. The overflow bit must be included in the data path of the multiplier circuit of the present invention in order to provide for the truncation of leading *signed* bits.

An additional consideration results when it is necessary to not merely truncate leading bits of a signed digit number, but actually separate the signed digit number into a most significant portion and a least significant portion without affecting the [accuracy of each portion] *value of their sum* or incurring the speed penalties incurred in a conversion of the entire bit string to non-redundant format. This procedure may occur, for example, in the conversion of a real number to a binary coded decimal (BCD) number where each BCD digit is resident in the most significant portion of a bit string during the conversion process. The additional consideration inheres in the fact that the least significant portion may require a borrow into the most significant portion, affecting the values in each portion. The least significant portion may be converted using the overflow bit described above. The most significant portion may be converted by determining the sign of the least significant portion and if negative, decrementing the most significant portion.

Top Level Description of Functionality

Multiplier circuit 40 may be used in the following manner to implement the method of mathematical function evaluation of the present invention through the fast and efficient performance of the multiplication, division and square root operations. C-latch 44 is seventy-one bits wide and is loaded from the system bus 42. It can be loaded in three ways. The entire register can be loaded from the most significant portion of the system bus 42. Secondly, the most significant thirty-five bits can be independently loaded from the most significant part of the system bus 42. Finally, the least significant thirty-six bits of the C-latch 44 can be loaded independently from the most significant part of the system bus 42. The C-latch 44 is divided into quadrants so it can drive the short side of the multiplier core 58. The fourth quadrant, which is the most significant quadrant of the C-latch 44 is seventeen bits, which is one bit shorter than the remaining *quadrants* which are each eighteen bits in width.

The fifth MUX [52] *62* selects from various bits of the C-latch 44 or from the constant generator 60 to drive the [MULTIPLEXER] *MULTIPLIER* input and the [MULTIPLEXER] *MULTIPLIER* CARRY IN input of the multiplier core 58. It also provides a control input to shifter 84 which is used in a special 19 bit wide multiply that will be discussed herein.

FIG. 5 is a tabular description of MUX 62. MUX 62 selects from five different combinations of the C-latch 44 or three different constant values. Shifter 84 control is used during the 20 bit multiplies. MULTIPLIER and MULTIPLIER CARRY-IN are inputs to the multiplier core 58. In FIG. 5, the notation c[16:0] stands for the range of bits from 16 through 0 of the C-latch 44, [obeying] *0 being* the least significant bit.

The D-latch 48 is sixty-nine bits wide and is divided into quadrants. The D-latch 48 can be loaded in four different ways. The entire D-latch 48 may be loaded with the most significant bits of the system bus 42 or each of the three least significant quadrants of the D-latch 48 may be independently loaded with the seventeen most significant bits of the system bus 42.

The converter 64 converts the non-redundant value in the D-latch 48 into a signed digit number by appending a sign bit to each data bit. The sign bits can all be set to 0 corresponding to a positive number or [all] set to 1 *for each data bit which is a one* corresponding to a negative number. Additionally, each of the three least significant quadrants independently can be set negative while the remaining quadrants are positive.

The long side of the multiplier core 58 is driven by the sixth MUX 66. Sixth MUX 66 selects between seventy bits input from the feedback latch 82 in signed digit format, or sixty-nine bits input by the converter 64. If the data from the converter 64 is selected, the most significant bit or overflow bit is set to zero. The entire contents of the D-latch 48 or any of the four quadrants of the D-latch 48 can be negated as required.

The output of the multiplier core 58 passes through a shifter 68 which is capable of shifting the product left or right by one or passing the product through unshifted. After passing through shifter 68, the most significant bit of the product is truncated and the product is loaded into the result latch 70. Data from the result latch 70 may be optionally shifted left seventeen bits by shifter 80 as it is loaded into the feedback latch 82. The output of the feedback latch 82 may be conditionally negated. The output of the feedback latch 82 may drive the long side of the multiplier core 58 through the sixth MUX 66 or may be input into the FEEDBACK input of the multiplier 58 through shifter 84. Shifter 84 can pass data through unshifted, shift left by one or two, or shift right by 18-bit positions.

The operations of shifting left by one or two bit positions are only performed by shifter 84 when it is known from the operations being performed that the one or two most significant data bits of the data paths are not occupied by significant data. The shift right by 18 operation is used for purposes of aligning portions of a product during multiplication operations which will be described herein.

The indicator 76 determines the sign and magnitude of certain fields of the eighty-seven *signed* bits output by the result latch 70. During a multiplication operation, the indicator 76 keeps track of the least significant *signed* bits of the product to determine if any *non-zero* bits are thrown away and, if so, the sign of the discarded number. The indicator 76 is operable to determine the sign of at least significant portion of the data path during the separation of the data bits into two portions during real to BCD conversion version as discussed previously. The indicator 76 functions to set the overflow bit if the least significant portion of the data path is negative. During division and square root operations, the indicator 76 determines whether a remainder value is non-zero and if non-zero, whether it is positive or negative. This information is stored by indicator 76 in a status block 78. Status block 78 is also coupled to remaining components of the system through control lines (not shown) and to the converter 72. The status block 78 communicates to the converter 72 whether a large radix digit value has been determined to be positive or negative such that the converter 72 may appropriately complement the non-redundant representation of the value prior to loading it in the E-latch 74 as required by the division and square root operations discussed herein.

The converter 72 receives a positive or negative signed digit value from the most significant seventy-five bits output by the result latch 70, along with the sign and indicator bits from the indicator 76, and converts this data to a positive 74-bit non-redundant number. This number is conditionally stored in the 74-bit E-latch 74 with the indicator bit in the least significant location. An important feature of the present invention inheres in the capability of converter 72 to detect a maximum value output by result latch 70 indicating an overflow out of the data path. Converter 72 is operable to saturate the value output to E-latch 74 if an overflow is present after conversion of the maximum value to non-redundant format. The output of the E-latch 74 is coupled to the system bus [12] *42*. The E-latch 74 is operable to output to the system bus 42 either a full 74 bit value or a truncated 17 bit large radix digit value as required by operations discussed herein.

Referring to FIG. 3, each of partial product generators 112 through 122 are radix eight with modified Booth recoding capability. Accordingly, each partial product generator is capable of producing between −4 and +4 times a multiplicand. Each of Booth recoder circuits 100 through 110 require four bits of the multiplier. The eighteen bits of the MULTIPLIER input are divided equally three bits to each of the six recoders 100 through 110. In addition, there is a one bit overlap between adjacent recoders which provide the fourth bit input into each recoder, thus, each of recoder circuits 100 through 110 are coupled to three respective bits of the MULTIPLIER input and to the most significant bit of an adjacent lesser significant recoder circuit. Modified Booth recoder circuit 100 is the least significant recoder circuit, and is accordingly coupled [to- the] *to the* three least significant bits of the MULTIPLIER input and the single bit of the MULTIPLIER CARRY-IN input.

The following truth table describes the recoding of the multiplier bits into the modified Booth format as they are input to each of the partial product generators 112 through 122.

| Multiplier | Carry-In | Modified Booth Recorder Output |
|---|---|---|
| 000 | 0 | 0 |
| 000 | 1 | 1 |
| 001 | 0 | 1 |
| 001 | 1 | 2 |
| 010 | 0 | 2 |
| 010 | 1 | 3 |
| 011 | 0 | 3 |
| 011 | 1 | 4 |
| 100 | 0 | −4 |
| 100 | 1 | −3 |
| 101 | 0 | −3 |
| 101 | 1 | −2 |
| 110 | 0 | −2 |
| 110 | 1 | −1 |
| 111 | 0 | −1 |
| 111 | 1 | 0 |

Within each partial product generator 112 through 122, multiplying by one, two or four is simply accomplished by shifting the multiplicand. Multiplying by three is accomplished by the [times] *times-three* three adder 98 which adds one times the multiplicand to two times the multiplicand. The output of adder 98 is input to all of the partial product generators 112 through 122. In this manner, one, two, three and four times the multiplicand is available at the inputs of each of the partial product generators 112 through 122.

Because signed digit notation is used, the negation of a value to be output by each of partial product generators 112 through 122 is simple. Negation of a number is accomplished by inverting each sign bit which has a corresponding data bit which is a one. Thus, each partial product *generator* has at its inputs the multiplicand and three times the multiplicand and is operable to select one, two, three or four times the multiplicand, *or output zero,* and selectively negate the output to provide the full range of +4 to −4 times the multiplicand.

The outputs of the partial product generators 112 through 122 are seventy-two bits wide. Each of the level one adders 124, 126 and 128 add the output of two partial product generators offset by three. The outputs of level one adders 124, 126 and 128 are seventy five bits wide. The level one adder 130 adds the ADDER INPUT to the FEEDBACK INPUT with [the] *their* most significant bits aligned. Level two adder 132 adds the outputs of level one adders 124 and 126. The outputs of level one adders 124 and 126 are offset by six, and the output of level two adder 132 is eighty-one bits wide. Level two adder 134 adds the outputs of level one adders 128 and 130 with their most significant bits aligned. The output of level two adder 134 is eighty-eight bits wide. The two level two adders 132 and 134 are added together in the level three adder 136 with their least significant bits aligned. The constant port 138 can generate the constants two and three halves which can also be added in the level three adder 136, as required by Newton-Raphson approximation methods used in the division and square root operations as described herein. The final product of the multiplier core 58 is output by the level three adder 136 and is eighty-eight bits wide.

Multiplication

In operation, a full precision multiplication operation is accomplished in four passes through the multiplier core 58 followed by a conversion cycle. The input operands are loaded from the system bus 42. A sixty-nine bit multiplicand is loaded into the D-latch 48 and a seventy-one bit multiplier is loaded into the C-latch 44. Both input operands are in non-redundant format. The A-latch 56 and the feedback latch 82 are both cleared.

In the first pass, the least significant eighteen bits of the multiplier are selected by multiplexer 62 and pass to the [multiplier input] *MULTIPLIER INPUT* of the multiplier core 58. Multiplexer [82] *62* initially sets the MULTIPLIER CARRY-IN input to zero. The multiplicand in the D-latch 48 is converted into a signed digit number in the converter 64 by setting all the sign bits of the multiplicand to zero. This value is selected by multiplexer 66 which appends a zero to the most significant end. The resulting seventy [bits] *bit* signed digit number then becomes the MULTIPLICAND input to the multiplier core 58. The MULTIPLICAND input remains unchanged [to] *through* the rest of the multiplication procedure. Since the A-latch 56 and the feedback latch 82 are cleared, the ADDER input and the FEEDBACK INPUT to the multiplier core 58 are zero. The shifter 68 truncates the most significant bit of the 88-bit product output by the multiplier core 58 which is guaranteed to have a non-significant value by the modified Booth recoding performed in multiplier core 58 and outputs the resulting eighty-seven bit signed digit number to the result latch 70. The result latch 70 then contains the partial product, the seventy-five most significant bits of which are then sent to the feedback latch 82 and the least significant eighteen bits of which are sent to the indicator 76. The output of the feedback latch 82 is shifted right eighteen places in shifter 84 and passed to the FEEDBACK input of the multiplier core 58. Only the most significant seventy-five bits of the partial product are latched into feedback latch 82. The twelve least significant bits of the partial product are truncated during the loading of feedback latch 82. Six additional bits are lost during the 18 bit right shift operation performed by shifter 84. These eighteen bits stored in the result latch 70 which are not returned to the FEEDBACK input are read by the indicator 76. The indicator 76 comprises a sign and a zero latch that record if the 18 truncated bits are zero, and the sign of a non-zero value.

In the second and third passes, the second and third least significant eighteen bits of the multiplier are selected respectively by multiplexer 52 and passed to the [of the] MULTIPLIER input of the multiplier core 58. The MULTIPLIER CARRY-IN is set equal to the most significant bit of the previous quadrant of the C-latch 44. The MULTIPLICAND input and the ADDER INPUT remain unchanged. The FEEDBACK input contains the partial product from the previous pass shifted right by eighteen to properly align it. The most significant part of the new partial product is stored in the feedback latch 82. The least significant eighteen bits are checked by the indicator 76. If any ones are set in the eighteen bits that are passed to the indicator 76, the sign *and zero* latches are updated appropriately or else the old values of these latches are retained.

The fourth pass [to] *through* the multiplier core 58 is similar to the previous passes with the most significant seventeen bits of the multiplier being selected by the multiplexer 62. The final segment of the multiplier is a 17-bit value allowing the most significant bit of the multiplier input to be set to zero. As the final product is present in result latch 70, the most significant seventy-five bits of the result latch 70 are sent to the converter 72. The remaining twelve bits are input to the indicator 76 which updates the zero and sign latches contained therein. The resulting value of the sign latch is passed to the converter 72. The converter 72 converts the signed digit result into a non-redundant format. If the indicator 76 has truncated a negative number, this result is decremented by one. After the seventy-five bit number has been converted, the most significant bit will always be equal to zero. The remaining seventy-four bits are latched in the E-latch 74 such that the result may be read across the system through the system bus 42. The [remaining] system can also read the final value of the zero latch contained in the indicator 76 which indicates whether any bits were truncated, and therefore, whether the result is precise.

Division Operation Specific Hardware

The multiplier circuitry is also extremely useful in performing a novel method of division used in the method of the present invention. This method of division is described in full in Applicants' co-pending application "Method and Apparatus for Performing Division Using a Rectangular Aspect Ratio Multiplier", Ser. No. 07/389,051, filed Aug. 2, 1989 (*now U.S. Pat. Nos. 5,046,038 and 5,307,303*). The following hardware was added to the multiplier circuit 40 to efficiently divide using the aforementioned method.

The first part of the divide operation uses the Newton-Raphson method of reciprocal evaluation. This method starts with the seed value from a look-up table and iterates that value with the following equation until the desired accuracy is [required] *achieved*.

$$y''=y'(2-yy')$$

where, y"=new value of reciprocal y'=old value of reciprocal; and y=divisor.

The equation is evaluated with two passes through the multiplier core 58. The divisor is loaded into the D-latch 48. The seed value of the reciprocal is loaded into the C-latch 44. When the value in the D-latch 18 is converted to signed digit notation in converter 64, it is negated. The constant generator 138 adds in a constant two into the level three adder 136. The product of the first pass is equal to (2−yy'). The most significant seventy-five bits of this product are stored in the feedback latch 82. The second pass through the multiplier core 58 multiplies the result of the first pass times the starting approximation of the reciprocal.

Because the multiplier 58 can accept the MULTIPLICAND input in signed digit format, a conversion to non-redundant format is not required, and the two passes through the multiplier core 58 can be on back to back clock cycles. On the second pass through multiplier core [28] *58*, the multiplier input remains constant while multiplexer [36] *66* selects the feedback latch 82 to supply the MULTIPLICAND input.

The approximate reciprocal is then iterated an additional time using two additional passes through multiplier core 58. On the final pass through multiplier core 58, a reciprocal bias adjustment factor is added through the A-latch 56 and the ADDER input.

The division algorithm requires a multiplication by a nineteen bit reciprocal value to have enough accuracy to calculate the 17-bit quotient digit value. Because a small reciprocal bias adjustment factor is added to the *final approximate reciprocal before truncation to obtain the short* reciprocal to guarantee that it is never too small, it is possible that the nineteen bit value will overflow into a twenty bit value.

The input operand to the short side of the multiplier core 58 for the nineteen or twenty bit multiply, is the field of the C-latch 44 *where the short reciprocal has been placed* which corresponds to the second least significant eighteen bits of the C-latch 44 shifted left by one place. The nineteen or twenty bit multiply is accomplished by using the FEEDBACK input into the multiplier core 58. The eighteen least significant bits are fed to the [MULTIPLEXER] *MULTIPLIER* input of the multiplier core 58. The multiplicand must be loaded into the feedback latch 82. Multiplexer [36] *66* selects the feedback latch 82 and passes it to the MULTIPLICAND input. Additional copies of the multiplicand are shifted left by one or two in the shifter 84 and input into the FEEDBACK input of the multiplier core 58. Because the upper and lower bounds of the reciprocal are known, the eighteenth and nineteenth bits of the aforementioned field of C-latch 14 can control the shifter 84. The following table shows all possible combinations of the twenty bit reciprocal and that there are only three possible combinations of the eighteenth and nineteenth bit.

| Bit Number |
|---|
| 20 1 |
| 010xxxxxxxxxxxxxxxxx |
| 011xxxxxxxxxxxxxxxxx |
| 100000000000000000000x |

The [first] *least significant* eighteen bits of the multiplier go through the modified Booth recording process in modified Booth recoders 100 through 110. Bits [49] *19* and [50] *20* are accounted for with the FEEDBACK input to the multiplier core 58. The setting of the eighteenth bit requires an addition of one times the multiplicand through the FEEDBACK input because the MULTIPLIER [INPUT] *input* is encoded using a modified Booth's algorithm and setting the eighteenth bit normally causes the multiplier core 58 to output a negative number. During a typical full precision multiplication operation, the negative value is corrected on the next pass through the multiplier core 58 by incrementing the MULTIPLIER input and thereby adding in the multiplicand one additional time. However, in this case, there is no second pass through the multiplier core 58 so the correction is accomplished with the multiplicand added through the FEEDBACK input.

All the possible combinations of bits 18, 19 and 20 are shown below along with the number of times the multiplicand must be added in the FEEDBACK input. Since only one and two times the multiplicand is required, the hardware required to generate the number is only shifter 84. It can also be seen from the following table that bits 18 and 19 are all that is required to control the operation of shifter 84.

| BIT # | | | |
|---|---|---|---|
| 20 | 19 | 18 | Number to be Added |
| 0 | 1 | 0 | 1 times the multiplicand |
| 0 | 1 | 1 | 2 times the multiplicand |
| 1 | 0 | 0 | 2 times the multiplicand |

The data path width required for these operations is not at all obvious. It is important to understand the data path width required by a normal multiplication operation performed using multiplier circuit 40. Signed digit representation of a number requires a single overflow bit to be appended to the data path. This single bit is truncated when the result is converted to a non-redundant number. For the purpose of this discussion, the overflow bit will *not* be counted in the data path width. The process of modified Booth recoding centers the product about zero so that the magnitude of the product of a modified Booth recoded multiplier is one bit smaller than a normal multiplier. This bit is traded for a sign bit. This also implies that the product needs to be corrected on a subsequent cycle. In the multiplier circuit of the present invention, if the short side input is eighteen bits, it produces a signed partial product and a carry bit which can be corrected on a subsequent cycle. On the final pass through multiplier core 58 during a full precision multiplication operation, the multiplier is normally limited to seventeen bits. A 17×69-bit multiply can produce an 86-bit result, (*with the overflow bit*) which is exactly the width of the bus coupling the result latch 70 to the shifter 80.

The 20-bit multiply operation described above is accomplished without increasing the 86-bit bus to hold the result. This means that three extra bits must be accounted for. The first of the three bits is trivial. Shifter [58] *68* always does a shift right by one place during the 20 bit multiplication operation. One bit is lost in the least significant end of the data path because of this right shift, but since this multiplication operation is only used for calculating an estimate of the quotient truncated to seventeen bits, this bit will be truncated anyway.

A second bit is dependent upon the novel division method used in conjunction with the multiplier circuit used in connection with the method of mathematical function evaluation of the present invention. For example, in the division operation, the 20-bit multiply is used to calculate the 17-bit quotient digit value by multiplying the reciprocal of the divisor by the dividend or partial remainder. The dividend is always shifted right making the long side sixty-eight bits instead of sixty-nine bits, which results in a 16-bit or 17-bit quotient digit value. On subsequent passes, the partial remainder may be sixty-nine bits in width. However, the method of division is such that this only occurs when the reciprocal is small enough so that the product of the reciprocal and the partial remainder will never result in an 18-bit digit.

The argument discussed above is only valid if the quotient digit value is calculated using the exact reciprocal. It is in this manner that the third bit is explained. Because an estimate of the reciprocal is used, the rounding of that estimate may cause a quotient digit value to be slightly larger than seventeen bits. The division method is such that the actual exact value of *a* quotient digit is never greater than seventeen bits. Therefore, the multiplier circuit of the present invention recognizes an overflow out of the multiplier, and forces the answer to be the largest possible 17-bit number using the saturation capability of converter 72 as discussed previously.

The method of division used in conjunction with the method of mathematical function evaluation of the present invention continues by loading the dividend into the D-latch 48. An appropriate constant is selected from the constant port 60 by multiplexer 62 such that the result latch 70 is equal to the dividend divided by two, which is passed through the shifter 80 and latched into the feedback latch 82. The divisor is then loaded into the D-latch 48. The short reciprocal of the divisor which was calculated in the aforementioned portion of the division method remains in the least significant half of the C-latch 44.

The first quotient digit value is calculated by multiplying the short reciprocal by the dividend in multiplier core 58 using the 20 bit multiply operation described above. The product is latched into result latch 70 after being shifted right one bit position in shifter 58. The product is converted to non-redundant format in converter 72 and loaded into the E-latch 74. The E-latch 44 truncates the quotient digit value to seventeen bits and places it on the system bus 42. The quotient digit value is loaded from the system bus 42 into the most significant half of the C-latch 44 without disturbing the short reciprocal value which remains in the least significant half of the C-latch 44.

The first partial remainder is then calculated. The multiplexer 62 selects the first quotient digit value from the most significant half of the C-latch 44. The converter 64 negates the divisor which is stored in the D-latch 48, which is selected by multiplexer 66 to drive the MULTIPLICAND input of the multiplier core 58. The value equal to one-half the dividend is passed unchanged through shifter 84 from feedback latch 82 to drive the FEEDBACK input to the multiplier core 58. The first quotient digit value is then multiplied by the negated divisor and subtracted from the dividend in multiplier core 58. This entire process occurs in a single clock cycle. The subtraction operation cancels the seventeen most significant bits of the result. The value in the result latch 70 is then shifted left by 17-bit positions and loaded into the feedback latch 82. This process is repeated using each successive partial remainder in place of the dividend in the described iteration until the desired number of quotient digit values are obtained.

It is possible for the value of the remainder to be negative. If the remainder is negative, the next quotient digit value will also be negative. However, the quotient digit value is passed to the MULTIPLIER input to calculate the next remainder, and the MULTIPLIER input cannot accept negative numbers. The indicator 76 determines the sign of the remainder and sets a sign status flag in the status block 78 when the remainder is negative. The converter 72 complements the quotient digit value based on the sign status flag such that the quotient digit value is always converted to a positive number. The converter 72 is also controlled by the sign status flag so that the sign of the multiplicand is always opposite the sign of the value stored in feedback latch 82 when each new remainder is calculated.

Because the reciprocal bias adjustment factor is added to the reciprocal before it is truncated, it is possible for the quotient digit value to overflow into an 18-bit number. Since it is known *by* the characteristics of the division method that the quotient digit value is always less than an 18-bit value, an overflow into an 18-bit number is detected in the converter 72 and is replaced by the largest possible 17-bit number as discussed previously.

Square Root Operation Specific Hardware

The multiplier circuit used in conjunction with the method of the present invention can also be used in conjunction with a novel method of performing the square root function which is fully described in Applicants' co-pending application, "Method and Apparatus for Performing the Square Root Function Using a Rectangular Aspect Ratio Multiplier", Ser. No. 07/402,822, filed Sept. 5, 1989 (*now U.S. Pat. Nos. 5,060,182 and 5,159,566*).

Essentially, the method of performing the square root function used in conjunction with the method of the present invention is very similar to the method described above for performing the division function. However, there are some features of the multiplier circuit 40 which are used in the square root function which are not used in the division function. For example, the multiplier circuit 40 must have the ability to selectively negate each root digit value as it is calculated. This is accomplished by the sub-division of the D-latch 48 into four quadrants, the most significant quadrant being eighteen bits in width and the remaining three quadrants being seventeen bits in width.

The method of performing the square root function used in conjunction with multiplier circuit [10] *40* uses a modified Newton-Raphson approximation to iteratively generate an approximation of the reciprocal of the square root of the operand. The equations iterated are given as follows:

$$y''=y'(3/2-y/2(y')^2)$$

where, y"=the new value of the reciprocal, y'=the old value of the reciprocal, and y=the operand for operands having even exponents; and $$y''=y'(3/2-y(y')^2)$$

where, y"=the new value of the reciprocal, y'=the old value of the reciprocal, and y=one-half of the operand for operands having odd exponents.

Each iteration of the above equations are evaluated with three passes through the multiplier core 58 and two iterations are required such that the value of the reciprocal may be generated with six passes through multiplier core 58. Prior to the first pass, a seed value for the reciprocal is loaded from a look-up table (not shown) through system bus 42 into the C-latch 44. The operand is loaded initially in the D-latch 48.

For the first pass of the first iteration, the MUX 66 selects the operand stored in D-latch 48 and inputs it through the MULTIPLICAND input into multiplier core 58. The reciprocal seed value is input from the C-latch 44 through the MUX 62 into the MULTIPLIER input of multiplier core 58. Multiplier core 58 then forms the product of the seed value and the operand corresponding to y•y'or y/2•y' in the above equations. This product is then loaded into feedback latch [52] *82*. The division by two for even exponents is performed by a shift right by one place in shifter 68.

On the second pass, the prior product present in the feedback latch 82 is again multiplied by the seed value stored in C-latch 44. During the formation of this product, the product is negated and added to the constant three-halves output from constant port 138 in adder 136 to form the $(3/2-y(y')^2)$ and [$(3/2-y/2(y')^2$ ] $(3/2-y/2(y')^2)$ terms of the above equations. The appropriate one of these terms is then loaded into the feedback latch 82.

The third pass through multiplier core 58 completes the iteration by forming the product of the seed value stored in C-latch 44 and the value stored in feedback latch 82. This final product is then converted in converter 72 and loaded in C-latch 44. The operand remains in the D-latch [feedback latch 82] and the circuit 40 is thereby initialized for an additional iteration of the above-described equations.

On the final pass through multiplier core 58 during the second iteration of the above equations, a reciprocal bias adjustment factor is added to the value for the reciprocal to guarantee that, when used to generate root digit values, the reciprocal value will always produce the exact value of the root digits or a value that is one unit in the last place too large. Shifter 68 performs a shift left by one bit position to allow for the maximum number of significant data bits in the data path, the most significant data bit being expendable due to the normalization of the operand and reciprocal values. The final value of the reciprocal is converted to nonredundant format in converter 72 and the most significant bits are loaded into the least significant half of C-latch 44 via E-latch 74 and system bus 42. During the conversion of the reciprocal, the operand is multiplied by the constant one-half output by constant port 60 and shifter 68 performs a shift right by one place for even exponents and performs a no shift for odd exponents. The value output from shifter 68 is then loaded into feedback latch 82 and is equal to the value for one-half the operand for odd exponents and equal to one quarter the operand for even exponents.

An additional requirement of the square root method used in conjunction with the method of the present invention is that the previously calculated root digit value must be used in the later calculations. The previous root digit value exists in the most significant seventeen bits of the system bus 42 after its calculation. This root digit value must be able to be loaded into any of the quadrants of D-latch 48. Hence, circuit 40 comprises multiplexers 50, 52 and 54 which allow for this selective loading. Additionally, as discussed previously, each of the quadrants of the D-latch 48 can be negated if the sign latch within the status block 78 indicated a negative remainder indicating a negative digit.

A further requirement of the square root method is the ability to selectively add in digit bias adjustment factors to the product output by multiplier core 58 prior to the step of truncation which creates each root digit value. These correction factors are input through the A-latch 56 into the ADDER input of multiplier core 58 such that their addition does not incur any further clock cycles than are otherwise necessary for the square root method.

The multiplier circuit 40 in conjunction with the remainder of system 10 thus has the ability to perform the addition[,] *and* multiplication[, division, and square root] operations [required] *employed* by the method of mathematical function evaluation using segmented polynomial based approximation.

Mathematical Function Approximation

Referring now to FIG. 6, the method of mathematical function approximation of the present invention used in conjunction with circuit 40 is illustrated in flow chart form. The method shown is specially suited to operate in an arithmetic coprocessor system such as system 10 discussed with reference to FIG. 1 which has the ability to add, multiply, divide, and do square root operations rapidly using a rectangular aspect ratio multiplier with adder port such as circuit 40 shown in FIGS. 2 and 3.

Generally, the method shown in FIG. 6 is used to calculate an approximation to a function f(x) for given $x \epsilon (a,b)$ which is accurate to within some prescribed maximum relative error [E].

For the purposes of exposition, we suppose that the approximation of f(x) [has] *is recovered from* the form $f_a(x')=F*x'*P(z)$. Here x' is a reduced argument obtained from the input argument x, z is a reduced argument obtained from [x] *x'* which can be represented as a fixed-point number, P(z) is a function of z, and F is a scale factor which allows P(z) to be computed using fixed-point arithmetic. One technique of determining approximations [$f_a(x)$] $f_a(x')$ with this form is to choose P(z) to be a polynomial with the property that it minimizes the maximum magnitude of $[f(x')/\{F*x'\}]-P(z)$ on an interval which may be a subset of the original interval (a,b). Such approximations are called minimax approximations. For minimax approximations the maximum magnitude of the difference between $f(x')/\{F*x'\}$ and P(z) decreases as the degree of P(z) is allowed to increase. More general forms of approximation can be used provided that the determination of the value of the approximation involves only [the computation of] *performing loads, shifts,* adds, multiplies, divides [and] *or* square roots which are quickly and accurately performed by system 10 when used in conjunction with the method of the present invention.

In prior art, it would not have been efficient to use such approximation because their evaluation is costly in terms of computation time. The cost of evaluating such an approximation is the sum of the times it takes to perform the loads from the constant table and the adds, multiplies, divides, and square roots needed to compute the value of the approximation $f_a(x')$ *and perform its transformation*. For example if $P(z)=a0+a1*z+a2*z^2$ is a polynomial in z of degree 2 with coefficients a0, a1, a2 stored in the constant table, then evaluation of P(z) by Horner's rule proceeds as follows:

P1=z*a2+a1

P0=z*P1+a0

P(z)=P0 and would require [2] *3* loads of constants from the constant store 28 as well as 2 multiplies and 2 adds. The system 10 used in conjunction with the method of the present invention makes it efficient to use such approximations since it has been designed to quickly compute expressions of the form C*D+A which occur during the evaluation of P1 and P0. Schemes similar to Horner's rule exist which can be used to quickly evaluate other forms of approximation of mathematical functions.

In prior art, it would not have been efficient to use such forms of approximation as described herein. The present method requires first that a multiplication as well as an addition be performed in each iteration, second, that transformations be performed which may involve addition, multiplication, division, and square root, and third, that full by full multiplication operations be used. If the techniques of the present method had been implemented using the circuitry of the prior art, evaluation would proceed very slowly because of the use of add and shift type multipliers, or considerable circuitry would have to have been devoted to the implementation of a fast multiplier. The array multiplier circuit would have to be more complex because of the need to always perform full by full multiplications of the argument by itself or by [a constant] *another value*.

In the present system, the prior art problems are solved through the use of a rectangular [array] *aspect ratio* multiplier such as multiplier circuit 40 having an ADDER input capable of quickly performing a multiplication and an addition in one iteration. Additionally, the rectangular [array] *aspect ratio* multiplier used in conjunction with the method of the present invention is capable of performing fast multiplication, division and square root and, through the use of appropriate scaling of operands, is capable of saving time by performing accurate multiplies using less than full by full multiplies.

The method of polynomial evaluation will be described with reference to [an array] *a rectangular aspect ratio* multiplier circuit, such as circuit 40 having a multiplier core, such as multiplier core 58, having an aspect ratio of [19×69 bits] *approximately 1:4*. It should be understood, however, that the method of the present invention is applicable to a wide range of coupled multiplier circuits with adder ports. The particular multiplier circuit with adder port described herein is an embodiment chosen for the purposes of teaching the present invention, and should not be construed to limit the scope of the present invention.

FIG. 6 is a flow chart which illustrates in general the method of mathematical function approximation of the present invention. Referring to FIG. 6, the computation begins at step 140 wherein the system 10 is loaded with the function f(x) to be approximated and the argument x. The approximation method continues at step 142 wherein the argument x is reduced to arguments x' and z which make the approximation method more efficient. Once the reduced arguments x' and z are determined the approximation method continues at step 144 wherein the value of P(z) is determined. After the value of P(z) has been determined the approximation method continues at step 146 wherein the value of the approximation $f_a(x')=F*x'*P(z)$ is determined. The approximation method continues at step 148 with the recovery of the value of the approximation to f(x) from the computed value of $f_a(x')$.

Let x be a binary floating-point number in the range $-\infty<x<+\infty$. Binary floating-point numbers are represented using three distinct fields: the sign S, the significand M, and the *biased* exponent E. These fields are used to represent a number equal to $(-1)^S*(M)*2^{(E-BIAS)}$. The BIAS is an arbitrary constant [added to] *subtracted from* the exponent field with the property that all numbers which are stored have *biased* exponents E which are nonnegative integers. The significant M of nonzero numbers is always a number greater than or equal to 1 and less than 2. A pair of examples will illustrate the merits of this device when used to evaluate approximations of the form $f_a(x')=F*x'*P(z)$.

Consider first the computation of the sine of an input argument x. The approximation process for the sine of an arbitrary argument x begins by reducing the argument x as follows. First the argument is made nonnegative by using the identity $\sin(x)=-\sin(-x)$. This means that if x is negative, then x should be replaced by −x and the answer determined by the approximation method should be negated and returned as the value of the sine of x. Second the argument is reduced to a value x', whose magnitude is less than $\pi/4$ by repeated subtractions of the constant $\pi/2$. This repeated subtraction operation is closely related to exact division of x by $\pi/2$. The reduced argument x' obtained from this process is the exact remainder after division of x by $\pi/2$ produces the nearest integer quotient. As shown in FIG. 7, the last two significant bits of the quotient so obtained may be examined and used to determine the proper identity which must be applied to recover the required approximation to f(x) from the compound value of $f_a(x')$.

The form of the approximation used to approximate the sine of x' for an argument x' whose magnitude is less than $\pi/4$ is $$f_a(x')=x'*P(z)$$

where $z=(x')^2$ is the square of the reduced argument x'.

Here P(z) is the polynomial $$P(z)=a0+a1*z+z2*z^2+a3*Z^3+a4*z^4+a5*z^5+z6*z^6+z7*z^7$$

of degree 7 whose coefficients, in decimal form, are presented in FIG. 8. For arguments x' whose magnitude is less than $\pi/4$, the magnitude of the relative error in approximating sin(x') by x'*P(z) is less than $10^{(-20.7)}$. Once the coefficients of P(z) are determined, they are taken from constant store 28 via system busses 16 and 42 and input as necessary into multiplier circuit 40 shown in FIGS. 2 and 3.

The determination of the value of the approximation P(z) using Horner's rule proceeds as follows. Horner's rule for the evaluation of P(z) requires the following seven iterations:

P6=z*a7+a6,
P5=z*P6+a5,
P4=z*P5+a4,
P3=z*P4+a3,
P2=z*P3+a2,
P1=z*P2+a1,
P0=z*P1+a0, and
P(z)=P0 each involving a product and sum. The evaluation process begins with constant a7 from constant store 28 via system busses 16 and 42. The constant a7 is latched into the C-latch 44 and is input through the MUX 62 into the MULTIPLIER input of multiplier core 58. The argument z is loaded into the D-latch 48 from system bus 42 and is input through converter 64 and MUX 66 into the MULTIPLICAND input of multiplier core 58. The multiplier core 58 then forms the product a7*z as discussed previously. The argument z comprises 69 bits of information whereas the constant a7 comprises only 18 bits of information per pass through multiplier core 58. Thus it may take 1, 2, 3 or 4 cycles to form the full precision product a7*z, the number of cycles is dependent on the number of leading nonzero bits n the coefficient a7. The constant a6 is also loaded via the system busses 16 and 42 from the constant store 28 into the A-latch 56 and from there it is input to the ADDER input of the multiplier core 58. The constant a6 is then added to the product [a6*z] *a7*z* to form the sum P6=a7*z+a6.

The term P6 is then converted and loaded into the C-latch 44 through system bus 42. After being latched into the C-latch 44, P6 is input through MUX 62 into the multiplier core 58 through the MULTIPLIER input. The D-latch 48 once again inputs the argument z through the converter 64 and the MUX 66 into the MULTIPLICAND input of multiplier core 58 and the product of P6 and the argument z is formed. The coefficient a5 is simultaneously input into the ADDER input of the multiplier core 58 such that a5 is added to the product P6*z forming P5=P6*z+a5. This process will continue until the coefficient a0 is added to the prior product P1*z forming P0=P1*z+a0. At this point the final result is converted and the final value of P(z) is present in the E-latch 74. Once the value of P(z) has been determined then the value of the approximation $f_a(x')=x'*P(z)$ of the sine of x' is determined by computing the product of x' and P(z) using a floating-point multiply.

Dependent on the mathematical function f(x) being computed, it may be necessary to apply transformations to the computed value of $f_a(x')$ to recover the required approximation to f(x) as shown in step 148. As shown in FIG. 7, for the sine function these final transformations involve the possible computation of the square root of $1-\sin^2(x')$ as well as a possible negation of the result.

The method of the present invention allows the multiplications and additions z*a7+a6, z*P6+a5, . . . , z*P1+a0 which occur in Horner's rule to be calculated quickly. The method of the present invention also allows the rapid computation of square roots such as $$\sqrt{1-\sin^2(x')}$$

which are required as shown in FIG. 7. The method of the present invention is also capable of saving time by performing less than full by full multiplies. FIG. 9 presents the hexadecimal form of the coefficients of P(z) whose decimal form is presented in FIG. 8. The seven iterations used in the evaluation of P(z) of Horner's method would normally take 28 clock cycles if only full by full multiplies were used. [Through] *Thorough* examination of the hexadecimal form of the numbers presented in FIG. 9 shows that the number of clock cycles needed to evaluate P(z) can be reduced from 28 clock cycles to [22] *25* clock cycles. When the sine of x is evaluated by the CORDIC method the determination of an equally accurate result typically takes 96 clock cycles for evaluation and requires storage of 32 constants in the constant table. Using system 10 with multiplier circuit 40 in conjunction with the method of the present invention, the determination of the result typically takes 32 clock cycles for evaluation and requires storage of [7] *8* constants in the constant table. A further consideration is that the computation of P(z) by the method of the present invention is made faster by the computation of products and sums using fixed-point arithmetic. This makes the computation faster because the circuitry which accounts for the exponent of floating-point numbers is not needed. The only multiplication which requires the use of floating-point arithmetic is the final product *of* x' and P(z). Such a floating-point product of x' with P(z) is needed to properly account for the wide dynamic range of [possible input arguments x] *x'*.

An important consideration associated with the method of the present invention is that reduction of the argument x must be performed very accurately to minimize the error introduced into the reduced arguments x' and z. Such errors are irrecoverable since the actual computation of the approximation is performed using the reduced argument. This reduction of the argument x is usually performed to the highest available precision accommodated by the system to accommodate the wide dynamic range of the argument x. This accurate reduction of the input argument x is also necessary for the computation of other functions.

If the available precision of the system is sufficiently greater than that needed in the final result, then the frequently cited nonmonotonic behavior of polynomial based approximations can be eliminated. The elimination of the nonmonotonic behavior of polynomial based approximation is possible because performing each add, subtract, multiply, divide, and square root to a precision greater than that needed in the final result restricts the nonmonotonic behavior to bits which will be discarded when the value of the final result is determined. For example, when the sine function is approximated for arguments x whose magnitude is less than $\pi/4$, any approximation whose relative error has magnitude less than [$10(-19.7)$] $10^{(-19.7)}$ will be monotonic when chopped to its leading 64 significant bits.

A second example illustrating the performance improvement of the present method using the rectangular aspect ratio multiplier is the method for the computation of *the* base 2 logarithm or $\log_2(x)$ of an input argument x. The general approach of argument reduction, computation of approximation, and result transformation used for the sine function is also used for the base 2 logarithm function. However, understanding the merit of the method of the present invention requires examination of the argument reduction and polynomial evaluation [phase] *phases* of the process.

It is usually considered an error to compute the value of the base 2 logarithm for arguments x which are not positive. Therefore we will consider the approximation of the base 2 logarithm for arguments x which are positive numbers. The process of argument reduction for the base 2 logarithm of the argument x begins by first separating the binary floating point representation of the argument x into its significand M and its *unbiased* exponent E. The sign S of x is not needed since x is always positive. As stated previously, the significand of a binary floating-point number is a number greater than or equal to 1 and less than 2. Dependent on whether the significand M of the input argument x is greater than [2] $\sqrt{2}$ or less than or equal to [2] $\sqrt{2}$, the value of y is computed as presented in FIG. 10 and is a number which is greater than $\sqrt{2}/2-1$ and less than or equal to $\sqrt{2}-1$. As presented in FIG. 10, the determination of y involves the possible division of the significand M of x by two prior to the subtraction of one. This subtraction of one and potential division by two does not require the use of floating-point arithmetic. The argument reduction continues by computing $x'=y/(2+y)$. This computation of x' requires the aforementioned ability of the multiplier circuit 40 to quickly and accurately perform the required division of y by 2+y.

The approximation of the base 2 logarithm of x may continue by computing $w=(x')^2$, the square of x', and approximating the base 2 logarithm of x [by] *employing* x'*Q(w) where Q(w) is the polynomial $$Q(w)=b0+b1*w+b2*w^2+b3*w^{3+b}4*w^{4+b}5*w^5+b6*w^6+b7*w^7+b8*w^8+b9*w^9$$

of degree 9 whose coefficients, in decimal form, are presented in FIG. 11. The relative error in approximating log(x) [by] *employing* x'Q(w) is less than $10^{(-21.7)}$. As for the evaluation of the approximation of the sine function, Horner's method can be used to evaluate the polynomial Q(w) and uses 9 iterations each involving one multiply and one add. If Q(w) is to be evaluated using fixed-point arithmetic then each of its coefficients b0, b1, . . . , b9 must be divided by 4 thereby allowing the value of Q(w) to be determined using fixed-point arithmetic. A consideration of the hexadecimal form of these coefficients, when divided by 4, is presented in FIG. 12 and leads to the premature conclusion that the ability of the method of the present invention to use short by full multiplications cannot be utilized since the hexadecimal form of none of these coefficients have sufficiently many leading zeros.

To illustrate how the ability of the present invention to use short by full multiplies can be utilized we begin by noting that the magnitude of x', is never greater than 0.172. Therefore if $z=32*(x')^2$ is 32 times the square of x', then the magnitude of z is never greater than 0.947. The approximation of the base 2 logarithm of x can be written as 4*x'*P(z) where P(z) is the polynomial $$[P(z)=a0+a1*z+a2*z^2+a3*z^3+a4*z^4+a5*z^5a6*z^6+z7*z^7+a8*z^8+a9*z^9]$$

$$P(z)=a0+a1*z+a2*z^2+a3*z^3+a4*z^4+a5*z^5+a6*z^6+a7*z^7+a8*z^8+a9*z^9$$

whose coefficients, in hexadecimal form, are presented in FIG. 13. The potential to use short by [long] *full* multiplies is evident from this table. Consideration of FIG. 13 shows that the evaluation of P(z) can be performed using [one ¼ by full,] three ½ by full, three ¾ by full, and [two] *three* full by full multiplies. Evaluation of the polynomial P(z) can therefore be completed in [24] *27* clock cycles if short by full multiplies are used instead of the 36 clock cycles required if only full by full multiplies are used. This amounts to a [33] *25* percent reduction in the number of clock cycles needed to determine the value of P(z).

*To further facilitate an understanding of the invention disclosed herein for computing approximations of a plurality of mathematical functions, FIG. 14 illustrates circuit components of a numeric system 200 embodying features of the present invention. Of course, it will be understood from the description herein that the present invention is not limited to the particular numeric system illustrated in FIG. 14, and may be embodied in systems having various different or additional circuit components and alternative interconnections not shown in the figure.*

*In FIG. 14, the circuit components of numeric system 200 are each represented by a block labeled with the operation performed by the respective circuitry in computing mathematical function approximations in accordance with the present invention. The arrows indicate the direction of information flow between the circuit components. Numeric system 200 may be implemented using the structural elements of the system 10 illustrated in FIG. 1, in which case one or more of the structural elements of system 10, such as multiplier 34, may be common to two or more components that are shown separately in FIG. 14.*

*As shown in FIG. 14, numeric system 200 includes input circuitry 202 for receiving signals indicating a selected*

*mathematical function to be evaluated, an interval for which an approximation is to be computed, a maximum allowable relative error in a result and an initial argument. Coupled to input circuitry 202 is argument transformation circuitry 204, which transforms an initial argument received by input circuitry 202 into arguments which can be used in a fixed-point evaluation of a polynomial approximation associated with an indicated mathematical function. Polynomial evaluation circuitry 206 is coupled to argument transformation circuitry 204, and is used to evaluate polynomial approximations associated with indicated mathematical functions. The polynomial approximations are functions of a transformed argument generated by argument transformation circuitry 204 (e.g., the aforementioned argument z or w).*

*Argument transformation circuitry 204 provides another transformed argument (e.g., the aforementioned argument x') directly to approximating circuitry 208, which also receives from polynomial evaluation circuitry 206 a value generated through evaluation of a polynomial approximation. Approximating circuitry 208 uses the transformed argument received from argument transformation circuitry 204 and the value received from polynomial evaluation circuitry 206 to determine a value of an approximating function. Result recovery circuitry 210, coupled to approximating circuitry 208, recovers a result comprising the approximation of a mathematical function from the value determined by approximating circuitry.*

*As is further illustrated by FIG. 14, polynomial evaluation circuitry 206 includes a multiplier circuit 212 for computing the terms of polynomials. In an implementation on numeric system 200 using the structural elements of system 10 of FIG. 1, multiplier circuit 212 would be implemented by an embodiment of multiplier circuit 34 (such as that shown by multiplier circuit 40 of FIG. 2). Alternatively, multiplier circuit 212 may be implemented using a wide range of coupled multiplier circuits in accordance with the description above, as is illustrated in FIG. 14 by circuits 212a and 212b. Numeric system 200 also has memory circuitry 214, including a constant store 216 coupled to multiplier circuit 212 for the coefficients of polynomial approximations and a microprogram store 218 for argument transformation and result transformation routines. Coupled to memory circuitry 214 and input circuitry 202 is control circuitry 220, which selects and implements an appropriate polynomial approximation, an appropriate argument transformation routine and an appropriate result transformation routine responsive to the receipt by input circuitry 202 of signals indicating a selected mathematical function.*

In summary, the present invention provides an improved method for computation of approximations to mathematical functions. The method comprises three main steps: (1) reducing the magnitude of a starting argument x to a range where polynomial base approximations are more effective; (2) computing the result using this reduced argument and the special facilities of the proposed circuit; and (3) transformation of the computed result to a value which approximates the value of the mathematical function being approximated.

An important technical advantage of the method of the present invention inheres in its use of a rectangular aspect ratio multiplier with an associated adder port and associated circuitry to perform rapid and accurate multiplication, division, and square root operations. The additional adder port feature enables the system to perform a multiplication and an addition in one iteration. These features enable the system to evaluate a polynomial of degree N using Horner's rule in N iterations and to perform the required multiplication operations more quickly by utilizing the leading zeros in one of the numbers to be multiplied.

Another advantageous feature of the invention is its use of relatively few constants to achieve a given level of accuracy. This feature allows the system to allocate less space to the storage of constants in the constant store.

The present method also overcomes the objections of nonmonotonic behavior frequently made regarding the use of polynomial based methods of function approximation. The nonmonotonic behavior of polynomial based approximations can be eliminated by performing each of the add, multiply, divide, and square root operations to a precision sufficiently greater than that required by the precision of the final answer.

A further time and space saving feature is the scaling of constants and operands through transformations which may be performed quickly using the rectangular aspect *ratio* multiplier. This scaling allows for a less complex multiplier to be used in the multiplication of constants and operands with no associated loss of accuracy. This scaling also allows for the answer of a full by full multiply to be performed as an equivalent short by full multiply which requires fewer clock cycles.

Although the method of the present invention has been described in connection with a particular circuit embodiment, it should be understood that the method of function approximation of the present invention is equally applicable to a large number of multipliers with widely varying aspect ratios and widely varying numbers of adder ports using numbers using either [signed digit] *redundant* or non-redundant formats. The disclosure of the particular circuit described herein is for the purposes of teaching the present invention and should not be construed to limit the scope of the present invention which is solely defined by the scope and spirit of the appended claims.

What is claimed is:

1. A numeric system for computing approximations of a plurality of mathematical functions, comprising:

a multiplier circuit;

a circuitry for receiving signals indicating a mathematical function to be evaluated, an interval for which an approximation is to be computer, a maximum allowable relative error in a result and an initial argument;

first circuitry, electrically coupled to said circuitry for receiving signals, for transforming said initial argument into first and second transformed arguments which may be used in a fixed-point evaluation of a polynomial approximation associated with said indicated mathematical function;

circuitry, electrically coupled to said circuitry for transforming, for evaluating said polynomial approximation associated with said indicated mathematical function, said polynomial approximation being a function of said second transformed argument, wherein said circuitry for evaluating said polynomial approximation comprises said multiplier circuit;

a first memory circuit, electrically coupled to said multiplier circuit, for storing constants associated with said indicated mathematical function;

control circuitry, electrically coupled to said first memory circuit, for selecting and inputting selected ones of said constants into said multiplier circuit;

circuitry, electrically coupled to said first circuitry for transforming, for determining a first value of an approximating function using said first transformed argument and a second value generated through evaluation of said polynomial approximation; and second circuitry, electrically coupled to said first circuitry for determining, for transforming said first value of said approximating function to recover a result comprising the approximation of the mathematical function for said initial argument.

2. The system of claim 1 wherein said circuitry for evaluating said polynomial approximation comprises:

circuitry for evaluating a first first-order polynomial comprising a first sum of a first constant and a product of a second constant and said second transformed argument;

circuitry for evaluating a second first-order polynomial comprising a second sum of a third constant and a product of a fourth constant and said first sum; and circuitry for repeating the calculation of said second first order polynomial substituting for each repetition predetermined constants associated with said selected mathematical function for said third and fourth constants and substituting a value obtained from evaluating the first order polynomial of an immediately prior repetition for said first sum, a value generated by a final repetition constituting said second value generated by said polynomial approximation.

3. The system of claim 2 wherein said circuitries for evaluating and said circuitry for repeating comprise said multiplier circuit, said multiplier circuit having an adder input, a multiplier input and a multiplicand input, such that said multiplier circuit can evaluate a product and a sum required in the calculation of each first order polynomial simultaneously, said memory circuit electrically coupled to said multiplier input and said adder input.

4. The system of claim 3 and further comprising:

a feedback data path operating to selectably route a result output by said multiplier circuit to either said adder input of said multiplier circuit or said multiplicand input of said multiplier circuit responsive to control signals received from said control circuitry.

5. [The system of claim 1 wherein said circuitry for determining comprises said multiplier circuit operating to form a product of said second value generated through evaluation of said polynomial approximation, said first transformed argument and a scaling factor, said product constituting said first value of said approximating function.] *A numeric system for computing approximations of a plurality of mathematical functions, said approximations having a significant and a precision defined by the number of bits in said significant, said numeric system comprising:*

*a multiplier circuit of the type including partial product generators and a plurality of adders capable of accumulating the partial products in a single pass, said multiplier circuit having internal hardware precision greater than that of said approximations for providing computed values at a precision greater than of that said approximations for use in subsequent operations of said numeric system;*

*a bus interface circuit for receiving signals indicating a mathematical function to be evaluated, an interval for which an approximation of said indicated mathematical function is to be computed, a maximum allowable relative error in a result and an initial argument;*

*mantissa and exponent arithmetic logic units and associated file circuits;*

*a first memory circuit which stores and supplies constants for computing approximations of said plurality of mathematical functions;*

*bus means electrically coupling said multiplier circuit, said bus interface circuit, said mantissa and exponent arithmetic logic units and associated file circuits, and said first memory circuit, said bus means including circuitry for returning values computed by the multiplier circuit to an input of said multiplier circuit, said circuitry having a hardware precision greater than that of said approximations; and*

*control circuitry, electrically coupled to and controlling operation of said multiplier circuit, said bus interface circuit, said mantissa and exponent arithmetic logic units and associated file circuits, and said first memory circuit, said control circuitry selecting and inputting selected ones of said constants into said multiplier circuit;*

*wherein said multiplier circuit, operating under control of said circuitry and in cooperation with said bus interface circuit, said mantissa and exponent arithmetic logic units, said associated file circuits, and said first memory circuit, comprises circuitry for:*

*(a) transforming an initial argument indicated by signals received by said bus interface circuit into first and second transformed arguments with values within intervals associated with an approximating function for a mathematical function indicated by signals received by said bus interface circuit, said first and second transformed arguments having precision greater than that of said approximations;*

*(b) evaluating a polynomial approximation associated with said indicated mathematical function as a function of said second transformed argument through a plurality of iterations in which values of primitive arithmetic operations required for said iterations are computed by said multiplier circuit and returned to an input of said multiplier circuit at a precision greater than that of said approximations,*

*(c) determining a first value of said approximating function using said first transformed argument and a second value generated through evaluation of said polynomial approximation; and*

*(d) transforming said first value of said approximating function to recover a result comprising the approximation of the mathematical function for said initial argument;*

*wherein the available precision of the numeric system is sufficient to allow monotonic behavior of the indicated mathematical function to be preserved in computed approximations of said indicated mathematical functions; and*

*wherein said multiplier circuit, in cooperation with said mantissa and exponent arithmetic logic units and said associated file circuits, determines said first value of said approximating function by:*

*forming a product of said second value generated through evaluation of said polynomial approximation, said first transformed argument and a scaling factor, said product constituting said first value of said approximating function.*

6. [The system of claim 1 wherein said multiplier circuit comprises a multiplier circuit having a rectangular aspect ratio.] *A numeric system for computing approximations of a plurality of mathematical functions, said approximations having a significant and a precision defined by the number of bits in said significant, said numeric system comprising:*

*a multiplier circuit of the type including partial product generators and a plurality of adders capable of accu-*

*mulating the partial products in a single pass, said multiplier circuit having internal hardware precision greater than that of said approximations for providing computed values at a precision greater than of that said approximations for use in subsequent operations of said numeric system;*

*a bus interface circuit for receiving signals indicating a mathematical function to be evaluated, an interval for which an approximation of said indicated mathematical function is to be computed, a maximum allowable relative error in a result and an initial argument;*

*mantissa and exponent arithmetic logic units and associated file circuits;*

*a first memory circuit which stores and supplies constants for computing approximations of said plurality of mathematical functions;*

*bus means electrically coupling said multiplier circuit, said bus interface circuit, said mantissa and exponent arithmetic logic units and associated file circuits, and said first memory circuit, said bus means including circuitry for returning values computed by the multiplier circuit to an input of said multiplier circuit, said circuitry having a hardware precision greater than that of said approximations; and*

*control circuitry, electrically coupled to and controlling operation of said multiplier circuit, said bus interface circuit, said mantissa and exponent arithmetic logic units and associated file circuits, and said first memory circuit, said control circuitry selecting and inputting selected ones of said constants into said multiplier circuit;*

*wherein said multiplier circuit, operating under control of said circuitry and in cooperation with said bus interface circuit, said mantissa and exponent arithmetic logic units, said associated file circuits, and said first memory circuit, comprises circuitry for:*

*(a) transforming an initial argument indicated by signals received by said bus interface circuit into first and second transformed arguments with values within intervals associated with an approximating function for a mathematical function indicated by signals received by said bus interface circuit, said first and second transformed arguments having precision greater than that of said approximations;*

*(b) evaluating a polynomial approximation associated with said indicated mathematical function as a function of said second transformed argument through a plurality of iterations in which values of primitive arithmetic operations required for said iterations are computed by said multiplier circuit and returned to an input of said multiplier circuit at a precision greater than that of said approximations,*

*(c) determining a first value of said approximating function using said first transformed argument and a second value generated through evaluation of said polynomial approximation; and*

*(d) transforming said first value of said approximating function to recover a result comprising the approximation of the mathematical function for said initial argument;*

*wherein the available precision of the numeric system is sufficient to allow monotonic behavior of the indicated mathematical function to be preserved in computed approximations of said indicated mathematical functions; and*

*wherein said multiplier circuit has a rectangular aspect ratio.*

7. The system of claim 1 wherein said second transformed argument comprises a fixed point number and wherein said polynomial approximation is evaluated using fixed point computations.

8. The system of claim 1 and further comprising:

a second memory circuit coupled to said first circuitry for transforming said second circuitry for transforming and said circuitry for evaluating, said second memory circuit operating to store a polynomial approximation, an argument transformation routine for generating said first and second transformed arguments and a result transformation routine for each mathematical function; and said control circuitry coupled to said second memory circuit for selecting and implementing an appropriate polynomial approximation, an appropriate argument transformation routine and an appropriate result transformation routine responsive to said selected function inputted.

9. The system of claim 8 wherein selected ones of said result transformation routines require addition, subtraction, multiplication, division and square root operations and wherein said circuitry for transforming said first value of said approximating function comprises:

an arithmetic logic unit for performing said addition and subtraction operations; and said multiplier circuit for use in performing said multiplication, division and square root operations.

10. The system of claim 9 wherein said multiplier circuit comprises a multiplier circuit having a rectangular aspect ratio.

11. The system of claim 1 wherein said circuitry for determining comprises:

circuitry for generating a product of said first transformed argument and said second value generated through evaluation of said polynomial approximation using a floating point multiplication operation.

12. The system of claim 11 wherein said circuitry for generating a product comprises a multiplier circuit having a rectangular aspect ratio.

13. A method for computing approximations of a plurality of mathematical functions, *said approximations having a significand and a precision defined by the number of bits in said significand,* using a numeric system comprising a rectangular aspect ratio multiplier circuit *of the type including partial product generators and a plurality of adders capable of accumulating the partial products in a single pass, a bus interface circuit, mantissa and exponent arithmetic logic units and associated file circuits, a constant store circuit, a microprogram store circuit and a timing and control circuit, said numeric system having hardware precision greater than that of said approximations, said method* comprising the steps of:

receiving electrical signals indicating a *mathematical* function to be evaluated, electrical signals representing an interval for which the approximation *of the indicated mathematical function* is to be computed, electrical signals representing a maximum allowable relative error in a result and electrical signals representing an initial argument;

transforming the electrical signals representing the initial argument into electrical signals representing first and second transformed arguments[, the electrical signals representing the arguments transformed such that the electrical signals representing the arguments may be used in a fixed-point evaluation of a polynomial approximation associated with the indicated mathematical function] *having values within intervals associated with an approximating function for the indicated mathematical function, said first and second transformed arguments having precision greater than that of said approximations*;

[determining a set of electrical signals representing constants to be used in the polynomial approximation associated with the indicated mathematical function;]

evaluating a polynomial approximation associated with the indicated mathematical function by inputting the electrical signals representing the second transformed argument *and a set of electrical signals representing constants for said polynomial approximation* into the rectangular aspect ratio multiplier circuit, the polynomial approximation being a function of the second transformed argument *and said evaluation being performed through a plurality of iterations in which values of primitive arithmetic operations required for said iterations are computed by said multiplier circuit and return to an input of the multiplier circuit at a precision greater than that of said approximations, said polynomial approximation being computed to a precision sufficient to allow monotonic behavior of the indicated mathematical function to the preserved in computing approximations of said indicated mathematical function*; *and* determining electrical signals representing a first value of [an approximation] *the approximating* function using the electrical signals representing the first transformed argument and electrical signals representing a second value generated by said step of [evaluation] *evaluating* the polynomial approximation; and transforming the electrical signals representing the first value of the approximating function to recover electrical signals representing a result comprising the approximation of the mathematical function for the initial argument.

14. The method of claim 13 wherein said step of [evaluation] *evaluating* a polynomial approximation comprises the steps of:

evaluating in the rectangular aspect ratio multiplier circuit a first [first order] *first-order* polynomial comprising a first sum of a first constant and a product of a second constant and the second transformed argument by inputting into the rectangular aspect ratio multiplier circuit electrical signals representing the first constant, the second constant and the second transformed argument;

evaluating a second [first order] *first-order* polynomial using the rectangular aspect ratio multiplier circuit, the second [first order] *first-order* polynomial comprising a second sum of a third constant and the product of [a fourth constant] *the second transformed argument* and the first sum, the second [first order] *first-order* polynomial evaluated by inputting into the rectangular aspect ratio multiplier circuit electrical signals representing the third constant, the [fourth constant] *second transformed argument* and the first sum; and repeating said step of evaluating a second [first order] *first-order* polynomial substituting for each repetition electrical signals representing *a* predetermined constant[s] associated with the selected mathematical function for the electrical signals representing *the* third [and fourth] constant[s] and substituting electrical signals representing a value obtained from the evaluation of the [first order] *first-order* polynomial of the immediately prior repetition for the electrical signals representing the first sum, the electrical signals representing a value generated by a final repetition of said step of repeating constituting the electrical signals representing the second value generated by *the said step of evaluating* the polynomial approximation.

15. The method of claim 14 and further comprising the step of:

storing a set of electrical signals representing constants associated with each polynomial approximation associated with each mathematical function.

16. The method of claim 14 wherein said step of determining [the] electrical signals representing a first value of an approximating function comprises the steps of:

forming a product of the second value generated through the evaluation of the polynomial approximation, the first transformed argument and a scaling factor using the rectangular aspect ratio multiplier circuit by inputting into the rectangular aspect ratio multiplier circuit electrical signals representing the second value, the first transformed argument and the scaling factor, the product constituting the first value of the approximating function.

17. The method of claim 13 wherein the second transformed argument comprises a fixed point number such that said step of evaluating a polynomial approximation comprises the step of:

evaluating the polynomial approximation using fixed point computations.

18. The method of claim 13 and further comprising the steps of:

storing in a memory circuit associated with the rectangular aspect ratio multiplier circuit electrical signals representing a polynomial approximation, argument transformation routine and a result transformation routine for each mathematical function; and selecting electrical signals representing an appropriate polynomial approximation, an appropriate argument transformation routine and an appropriate result transformation routine responsive to said step of receiving signals indicating a function to be evaluated.

19. The method of claim 13 wherein said step of determining comprises the step of:

generating a product using the rectangular aspect ratio multiplier circuit of the first transformed argument and the second value generated by evaluating the polynomial approximation using a floating point multiplication operation by inputting into the rectangular aspect ratio multiplier circuit electrical signals representing the first transformed argument and the second value.

*20. The method of claim 13 wherein said step of evaluating a polynomial approximation comprises the steps of:*

*receiving as inputs electrical signals representing a plurality of values of primitive operations required for evaluation of the polynomial approximation; and*

*computing electrical signals representing a plurality of values of primitive operations required for evaluation of the polynomial approximation;*

*wherein the electrical signals representing at least one of the input and computed values is of a greater precision than said result.*

*21. The method of claim 20 wherein said step of evaluating the polynomial approximation operates to compute the electrical signals representing the second value to a greater precision than said result.*

*22. The method of claim 20 wherein said step of evaluating the polynomial approximation operates to compute the electrical signals representing the second value to a precision sufficient to allow the monotonic behavior of the mathematical functions to be preserved in said result.*

*23. The method of claim 20 wherein said step of transforming to recover electrical signals representing a result rounds a plurality of least significant bit positions, said result after rounding has a least significant bit position, and said step of evaluating the polynomial approximation operates to compute the electrical signals representing the second value to a precision so that error in said result amounts to no more than one unit in the least significant bit position.*

*24. The method of claim 20 wherein the electrical signals representing first and second transformed arguments are computed to a greater precision than said result.*

*25. The method of claim 24 wherein the electrical signals representing the first and second values and the electrical signals representing the first and second transformed arguments are computed to a precision sufficient to allow the monotonic behavior of the mathematical functions to be preserved in said result.*

*26. The method of claim 24 wherein said step of transforming to recover electrical signals representing a result rounds a plurality of least significant bit positions, said result after rounding has a least significant bit position, and wherein the electrical signals representing the first and second values and the electrical signals representing the first and second transformed arguments are computed to a precision so that error in said result amounts to no more than one unit in the least significant bit position.*

*27. The method of claim 13 wherein said step of determining electrical signals representing constants operates to substantially minimize the maximum allowable relative error.*

*28. The method of claim 13 wherein said step of transforming to recover electrical signals representing a result rounds a plurality of least significant bit positions, said result after rounding has a least significant bit position, and said step of determining electrical signals representing constants operates so that error in said result amounts to no more than one unit in the least significant bit position.*

*29. The method of claim 13 wherein the approximating function comprises a segmented polynomial based approximating function.*

*30. A numeric system for computing approximations of a plurality of mathematical functions, said approximations having a significant and a precision defined by the number of bits in said significant, said numeric system comprising:*

*a multiplier circuit of the type including partial product generators and a plurality of adders capable of accumulating the partial products in a single pass, said multiplier circuit having internal hardware precision greater than that of said approximations for providing computed values at a precision greater than of that said approximations for use in subsequent operations of said numeric system;*

*a bus interface circuit for receiving signals indicating a mathematical function to be evaluated, an interval for which an approximation of said indicated mathematical function is to be computed, a maximum allowable relative error in a result and an initial argument;*

*mantissa and exponent arithmetic logic units and associated file circuits;*

*a first memory circuit which stores and supplies constants for computing approximations of said plurality of mathematical functions;*

*bus means electrically coupling said multiplier circuit, said bus interface circuit, said mantissa and exponent arithmetic logic units and associated file circuits, and said first memory circuit, said bus means including circuitry for returning values computed by the multiplier circuit to an input of said multiplier circuit, said circuitry having a hardware precision greater than that of said approximations; and*

*control circuitry, electrically coupled to and controlling operation of said multiplier circuit, said bus interface circuit, said mantissa and exponent arithmetic logic units and associated file circuits, and said first memory circuit, said control circuitry selecting and inputting selected ones of said constants into said multiplier circuit;*

*wherein said multiplier circuit, operating under control of said circuitry and in cooperation with said bus interface circuit, said mantissa and exponent arithmetic logic units, said associated file circuits, and said first memory circuit, comprises circuitry for:*

*(a) transforming an initial argument indicated by signals received by said bus interface circuit into first and second transformed arguments with values within intervals associated with an approximating function for a mathematical function indicated by signals received by said bus interface circuit, said first and second transformed arguments having precision greater than that of said approximations;*

*(b) evaluating a polynomial approximation associated with said indicated mathematical function as a function of said second transformed argument through a plurality of iterations in which values of primitive arithmetic operations required for said iterations are computed by said multiplier circuit and returned to an input of said multiplier circuit at a precision greater than that of said approximations,*

*(c) determining a first value of said approximating function using said first transformed argument and a second value generated through evaluation of said polynomial approximation; and*

*(d) transforming said first value of said approximating function to recover a result comprising the approximation of the mathematical function for said initial argument;*

*wherein the available precision of the numeric system is sufficient to allow monotonic behavior of the indicated mathematical function to be preserved in computed approximations of said indicated mathematical functions; and*

*wherein said multiplier circuit computes said arithmetic expressions used in evaluating said polynomial approximation to a greater precision then said result and said multiplier circuit computes to a precision sufficient to allow the monotonic behavior of said mathematical functions to be preserved in said result.*

*31. A numeric system for computing approximations of a plurality of mathematical functions, said approximations having a significant and a precision defined by the number of bits in said significant, said numeric system comprising:*

*a multiplier circuit of the type including partial product generators and a plurality of adders capable of accumulating the partial products in a single pass, said multiplier circuit having internal hardware precision greater than that of said approximations for providing computed values at a precision greater than of that said approximations for use in subsequent operations of said numeric system;*

*a bus interface circuit for receiving signals indicating a mathematical function to be evaluated, an interval for which an approximation of said indicated mathematical function is to be computed, a maximum allowable relative error in a result and an initial argument;*

*mantissa and exponent arithmetic logic units and associated file circuits;*

*a first memory circuit which stores and supplies constants for computing approximations of said plurality of mathematical functions;*

*bus means electrically coupling said multiplier circuit, said bus interface circuit, said mantissa and exponent arithmetic logic units and associated file circuits, and said first memory circuit, said bus means including circuitry for returning values computed by the multiplier circuit to an input of said multiplier circuit, said circuitry having a hardware precision greater than that of said approximations; and*

*control circuitry, electrically coupled to and controlling operation of said multiplier circuit, said bus interface circuit, said mantissa and exponent arithmetic logic units and associated file circuits, and said first memory circuit, said control circuitry selecting and inputting selected ones of said constants into said multiplier circuit;*

*wherein said multiplier circuit, operating under control of said circuitry and in cooperation with said bus interface circuit, said mantissa and exponent arithmetic logic units, said associated file circuits, and said first memory circuit, comprises circuitry for:*

*(a) transforming an initial argument indicated by signals received by said bus interface circuit into first and second transformed arguments with values within intervals associated with an approximating function for a mathematical function indicated by signals received by said bus interface circuit, said first and second transformed arguments having precision greater than that of said approximations;*

*(b) evaluating a polynomial approximation associated with said indicated mathematical function as a function of said second transformed argument through a plurality of iterations in which values of primitive arithmetic operations required for said iterations are computed by said multiplier circuit and returned to an input of said multiplier circuit at a precision greater than that of said approximations,*

*(c) determining a first value of said approximating function using said first transformed argument and a second value generated through evaluation of said polynomial approximation; and*

*(d) transforming said first value of said approximating function to recover a result comprising the approximation of the mathematical function for said initial argument;*

*wherein the available precision of the numeric system is sufficient to allow monotonic behavior of the indicated mathematical function to be preserved in computed approximations of said indicated mathematical functions;*

*wherein said multiplier circuit computes said arithmetic expressions used in evaluating said polynomial approximation to a greater precision then said result;*

*wherein said multiplier circuit, in cooperation with said mantissa and exponent arithmetic logic units and said associated file circuits, computes to a greater precision than said result when transforming said initial argument and when transforming said first value of said approximating function; and*

*wherein said multiplier circuit, in cooperation with said mantissa and exponent arithmetic logic units and said associated file circuits, computes to a precision sufficient to allow the monotonic behavior of said mathematical functions to be preserved in said result.*

*32. A numeric system for computing approximations of a plurality of transcendental functions, said approximations having a significand and a precision defined by the number of bits in said significand, comprising:*

*a multiplier circuit of the type including partial product generators and a plurality of adders capable of accumulating the partial products in a single pass, said multiplier circuit having internal hardware precision greater than that of said approximations and circuitry for outputting computed values at a precision greater than that of said approximations, said multiplier circuit having a rectangular aspect ratio;*

*a bus interface circuit for receiving signals indicating a transcendental function to be evaluated and an initial argument, said transcendental function having an associated first interval for which the approximation is to be computed and an associated approximating function comprising a polynomial;*

*mantissa and exponent arithmetic logic units and associated file circuits;*

*a first memory circuit for storing predetermined constants associated with said approximating function, said predetermined constants providing an associated maximum relative error in a computed approximation;*

*bus means electrically coupling said multiplier circuit, said bus interface circuit, said mantissa and exponent arithmetic logic units and associated file circuits, and said memory circuit, for routing data between said circuits of said system; and*

*control circuitry, electrically coupled to and controlling operation of said multiplier circuit, said bus interface circuit, said mantissa and exponent arithmetic logic units and associated file circuits, and said first memory circuit;*

*wherein said multiplier circuit, under control of said control circuitry and in cooperation with said mantissa and exponent arithmetic logic units, said associated file circuits, and said first memory circuit, comprises computing means for:*

*(a) transforming said initial argument into one or more transformed arguments with values within one or more intervals associated with said approximating function;*

*(b) evaluating said polynomial using at least one of said computed values to determine an input value for use in computing another of said computed values, and each such input value being of a greater precision than said result, said polynomial being a function of at least one of said transformed arguments, wherein said multiplier circuit receives as inputs predetermined constants from said first memory circuit and computes a plurality of values of primitive operations required for evaluation of said polynomial to a precision greater than that of said result, said evaluation being performed through a plurality of iterations in which values of primitive operations computed by the multiplier circuit are returned to an input of the multiplier circuit at a precision greater than that of said approximations; and*

(c) determining said result comprising the approximation of the transcendental function for said initial argument, using a first value generated through said evaluation of said polynomial, wherein said numeric system increases accuracy of said approximations by maintaining increased precision throughout calculation of said approximations.

33. A numeric system for computing approximations of a plurality of transcendental functions, said approximations having a significand and a precision defined by the number of bits in said significand, comprising:

a multiplier circuit of the type including partial product generators and a plurality of adders capable of accumulating the partial products in a single pass, said multiplier circuit having internal hardware precision greater than that of said approximations and circuitry for outputting computed values at a precision greater than that of said approximations;

a bus interface circuit for receiving signals indicating a transcendental function to be evaluated and an initial argument, said transcendental function having an associated first interval for which the approximation is to be computed and an associated approximating function comprising a polynomial;

mantissa and exponent arithmetic logic units and associated file circuits;

a first memory circuit for storing predetermined constants associated with said approximating function, said predetermined constants providing an associated maximum relative error in a computed approximation;

bus means electrically coupling said multiplier circuit, said bus interface circuit, said mantissa and exponent arithmetic logic units and associated file circuits, and said memory circuit, for routing data between said circuits of said system; and control circuitry, electrically coupled to and controlling operation of said multiplier circuit, said bus interface circuit, said mantissa and exponent arithmetic logic units and associated file circuits, and said first memory circuit;

wherein said multiplier circuit, under control of said control circuitry and in cooperation with said mantissa and exponent arithmetic logic units, said associated file circuits, and said first memory circuit, comprises computing means for:

(a) transforming said initial argument into one or more transformed arguments with values within one or more intervals associated with said approximating function;

(b) evaluating said polynomial using at least one of said computed values to determine an input value for use in computing another of said computed values, and each such input value being of a greater precision than said result, said polynomial being a function of at least one of said transformed arguments, wherein said multiplier circuit receives as inputs predetermined constants from said first memory circuit and computes a plurality of values of primitive operations required for evaluation of said polynomial to a precision greater than that of said result, said evaluation being performed through a plurality of iterations in which values of primitive operations computed by the multiplier circuit are returned to an input of the multiplier circuit at a precision greater than that of said approximations; and (c) determining said result comprising the approximation of the transcendental function for said initial argument, using a first value generated through said evaluation of said polynomial, wherein said numeric system increases accuracy of said approximations by maintaining increased precision throughout calculation of said approximations; and wherein said multiplier circuit, in cooperation with said mantissa and exponent arithmetic logic units and said associated file circuits, computes to a greater precision than said result when transforming said initial argument and to a precision sufficient to allow the monotonic behavior of said transcendental functions to be preserved in said result.

34. A numeric processing system which provides approximations of the sine function, comprising:

a system bus;

interface circuitry coupled to said system bus and to an integrated data processing system by which said integrated data processing system provides an input argument to said numeric processing system, and by which said numeric processing system transfers approximation results to said integrated data processing system, each result having a significand and a precision defined by the number of bits in said significand;

a microprogram store circuit programmed with control information for implementing a routine to approximate the sine function of said input argument, said approximation routine comprising argument transformation routines for reducing said input argument and one or more polynomial evaluation routines each for determining a value of a polynomial by computing iterative arithmetic expressions;

a constant store circuit coupled to said system bus;

mantissa arithmetic processing circuitry coupled to said system bus;

exponent arithmetic processing circuitry coupled to said system bus;

a multiplier circuit of the type including partial product generators and a plurality of adders capable of accumulating the partial products in a single pass, said multiplier circuit being coupled to said system bus and having circuitry for receiving constants from said constant store circuit and operands from said mantissa arithmetic processing circuitry as input values and for computing and outputting iterative values of arithmetic expressions, at least one of said computed and outputted values being used as an input value for a subsequent iteration, said multiplier circuit having data paths capable of routing values with more bits of precision than said significand of said result, and said input and computed values having precision greater than the highest precision at which the system is capable of providing said results; and a control and timing circuit coupled to said interface circuitry, said microprogram store circuit, said constant store circuit, said mantissa arithmetic processing circuitry, said exponent arithmetic processing circuitry and said multiplier circuit, said control and timing circuit cooperating with said microprogram store circuit to generate control signals for controlling operation of said numeric processing system in accordance with said sine function approximation routine;

wherein said numeric processing system preserves monotonic behavior of the sine function in computed approximation results by limiting error in said approximation results to less than one unit in the least significant bit position at the highest precision at which said

*system is capable of providing said results, said error being limited at least in part by employing internal hardware precision greater than said highest precision in intermediate computations throughout said one or more polynomial evaluation routines to maintain increased accuracy.*

*35. The numeric processing system of claim 34, wherein said argument transformation routine reduces said input argument to a magnitude less than a constant, said constant chosen such that approximation of said sine function computed by said numeric processing system preserve monotonic behavior of said sine function.*

*36. The numeric processing system of claim 35, wherein said constant is $\pi/4$.*

*37. The numeric processing system of claim 34, wherein said multiplier circuit uses at least one of said computed values to determine an input value for use in computing another of said computed values, said input value being of greater precision than said results.*

*38. The numeric processing system of claim 34 or 37, wherein approximations of said sine function computed by said numeric processing system preserve monotonic behavior of said sine function.*

*39. A numeric processing system for computing approximations of transcendental functions, comprising:*

*a command and data interface coupled to an integrated data processing system by which said integrated data processing system provides commands and associated data values to said numeric processing system specifying respectively particular transcendental functions and input arguments for which approximations of said specified transcendental functions are to be computed, and by which said numeric processing system returns data values to said integrated data processing system representing computed approximations of said specified transcendental functions, said approximations of said specified transcendental functions each having a significand and a precision defined by the number of bits in said significand;*

*a bus interface unit coupled to said command and data interface and to control signal paths and a system bus of said numeric processing system, said bus interface unit including decode and route circuitry which decodes commands received from said integrated data processing system and routes said decoded commands and associated data values received from said integrated data processing system to said control signal paths and system bus respectively;*

*a microprogram store circuit programmed with control information for implementing transcendental function approximation routines, at least one of said transcendental function approximation routines comprising one or more argument transformation routines for generating a transformed argument from an input argument received from said integrated data processing system, and one or more polynomial evaluation routines for determining a value of a polynomial by computing iterative arithmetic expressions using said transformed argument and a plurality of constants;*

*a constant store circuit coupled to said system bus in which said plurality of constants are permanently stored;*

*mantissa arithmetic processing circuitry coupled to said system bus, including a mantissa memory circuit and arithmetic logic unit;*

*exponent arithmetic processing circuitry coupled to said system bus, including an exponent memory circuit and arithmetic logic unit;*

*a multiplier circuit of the type including partial product generators and a plurality of adders capable of accumulating the partial products in a single pass, said multiplier circuit being coupled to said system bus and having circuitry for receiving constants from said constant store circuit and operands from said mantissa arithmetic processing circuitry as inputs and for computing values of arithmetic expressions, said computed values having precision greater than the highest precision at which said numeric processing system is capable of returning said approximations of said specified transcendental functions to said integrated data processing system, said multiplier circuit also including wide data paths and latches for returning said computed values to an input of the multiplier circuit at precision greater than said highest precision, whereby iterations are performed without rounding to said highest precision; and*

*a control and timing circuit coupled to said control signal paths of said bus interface unit, said microprogram store circuit, said constant store circuit, said mantissa arithmetic processing circuitry, said exponent arithmetic processing circuitry and said multiplier circuit, said control and timing circuit cooperating with said microprogram store circuit to generate control signals for controlling operation of said numeric processing system in accordance with said transcendental function approximation routines;*

*wherein said control signals include control signals directing said multiplier circuit to compute and return to an input of the multiplier circuit values of iterative arithmetic expressions of a polynomial evaluation routine at precisions greater than said highest precision such that a precision greater than said highest precision is retained in intermediate computations throughout said polynomial evaluation routine,*

*said numeric system limiting error in a result such that the result is accurate to one unit in the least significant bit position at said highest precision, and such that approximates computed by the numeric system preserve monotonic behavior of the mathematical function.*

*40. The numeric processing system of claim 39, wherein said multiplier circuit uses at least one of said computed values to determine at least one of said input values, each such input value for use in computing another of said computed values, and each such input value being of greater precision than said approximations of said specified transcendental functions.*

*41. The numeric processing system of claim 39, wherein said one or more argument transformation routines comprising said at least one transcendental approximation routine reduce said input argument to a magnitude less than a constant, said constant chosen such that approximations of a specified transcendental function computed using said at least one transcendental function approximation routine preserve monotonic behavior of the specified transcendental function.*

*42. A method for computing approximations of a plurality of transcendental functions using a numeric processing system comprising a microprogram store circuit programmed with control information for implementing routines to compute approximations of said plurality of transcendental functions, a timing and control circuit, a constant store circuit, a bus interface circuit, mantissa and exponent arithmetic logic units and associated file circuits, and a multiplier circuit of the type including partial product gen-*

*erators and a plurality of adders capable of accumulating the partial products in a single pass, said multiplier circuit having internal hardware precision greater than that of said approximations and a rectangular aspect ratio, the method comprising the steps of:*

*receiving electrical signals indicating a transcendental function to be evaluated and an initial argument, said transcendental function having an associated first interval for which the approximation of the transcendental function is to be computed and an associated approximating function comprising a polynomial approximation;*

*transforming the electrical signals representing the initial argument into electrical signals representing one or more transformed arguments, said first transformed argument being within the predetermined argument interval, said second transformed argument being a function of said first transformed argument and having precision greater than that of said approximations;*

*evaluating the polynomial approximation by inputting the electrical signals representing at least one of the transformed arguments into said multiplier circuit, and by selecting and inputting from said constant store circuit into said multiplier circuit electrical signals representing predetermined constants associated with said approximating function, said approximating function providing an iterative approximation which, over a predetermined interval, has sufficiently low relative error to preserve monotonic behavior of the transcendental function, and said polynomial approximation being a function of the inputted transformed argument, wherein said multiplier circuit computes and outputs results of a plurality of primitive operations required for iterative evaluation of said polynomial to a precision greater than said result; and*

*determining electrical signals representing a result comprising the approximation of the transcendental function for the initial argument, using electrical signals representing a first value generated by said step of evaluating the polynomial approximation;*

*wherein said step of evaluating the polynomial comprises the step of:*

*using electrical signals representing at least one of said computed values of said primitive operations to determine electrical signals representing an input value for use in computing another of said primitive operations, said input value being of greater precision than said result.*

*43. A method for computing approximations of a plurality of transcendental functions using a numeric processing system comprising a microprogram store circuit programmed with control information for implementing routines to compute approximations of said plurality of transcendental functions, a timing and control circuit, a constant store circuit, a bus interface circuit, mantissa and exponent arithmetic logic units and associated file circuits, and a multiplier circuit of the type including partial product generators and a plurality of adders capable of accumulating the partial products in a single pass, said multiplier circuit having internal hardware precision greater than that of said approximations, the method comprising the steps of:*

*receiving electrical signals indicating a transcendental function to be evaluated and an initial argument, said transcendental function having an associated first interval for which the approximation of the transcendental function is to be computed and an associated approximating function comprising a polynomial approximation;*

*transforming the electrical signals representing the initial argument into electrical signals representing one or more transformed arguments, said first transformed argument being within the predetermined argument interval, said second transformed argument being a function of said first transformed argument and having precision greater than that of said approximations;*

*evaluating the polynomial approximation by inputting the electrical signals representing at least one of the transformed arguments into said multiplier circuit, and by selecting and inputting from said constant store circuit into said multiplier circuit electrical signals representing predetermined constants associated with said approximating function, said approximating function providing an iterative approximation which, over a predetermined interval, has sufficiently low relative error to preserve monotonic behavior of the transcendental function, and said polynomial approximation being a function of the inputted transformed argument, wherein said multiplier circuit computes and outputs results of a plurality of primitive operations required for iterative evaluation of said polynomial to a precision greater than said result; and*

*determining electrical signals representing a result comprising the approximation of the transcendental function for the initial argument, using electrical signals representing a first value generated by said step of evaluating the polynomial approximation;*

*wherein said step of evaluating the polynomial comprises the step of:*

*using electrical signals representing at least one of said computed values of said primitive operations to determine electrical signals representing an input value for use in computing another of said primitive operations, said input value being of greater precision than said result; and*

*wherein said transforming step is performed by computing to a greater precision than said result; and*

*wherein said transforming and evaluating steps are performed by computing to a precision sufficient to allow the monotonic behavior of said transcendental functions to be preserved in said result.*

* * * * *